United States Patent [19]

Sugiyama et al.

[11] Patent Number: 4,694,293

[45] Date of Patent: Sep. 15, 1987

[54] DATA TRANSMISSION SYSTEM

[75] Inventors: Jun Sugiyama; Kiyoshi Hagino; Akira Usui, all of Hamamatsu, Japan

[73] Assignee: Nippon Gakki Seizo Kabushiki Kaisha, Hamamatsu, Japan

[21] Appl. No.: 776,689

[22] Filed: Sep. 16, 1985

[30] Foreign Application Priority Data

Sep. 18, 1984 [JP] Japan ................................ 59-195573
Sep. 26, 1984 [JP] Japan ................................ 59-200963

[51] Int. Cl.$^4$ ............................................ H04Q 11/04
[52] U.S. Cl. .......................... 340/825.68; 340/825.05; 340/825.07
[58] Field of Search ...................... 340/825.68, 825.51, 340/825.02, 825.52, 825.62, 825.05, 825.07; 377/39, 54, 80

[56] References Cited

U.S. PATENT DOCUMENTS

| | | | |
|---|---|---|---|
| 4,155,075 | 5/1979 | Weckenmann et al. | 340/825.07 |
| 4,335,426 | 6/1982 | Maxwell et al. | 340/825.05 |
| 4,608,562 | 8/1986 | Minor et al. | 340/825.52 |

Primary Examiner—Donald J. Yusko
Attorney, Agent, or Firm—Spensley Horn Jubas & Lubitz

[57] ABSTRACT

A data transmission system comprises a transmitter and a plurality of serially connected receivers. The transmitter, when energized, outputs an initialization signal to all of the receivers and also outputs a data of a predetermined value to the first receiver. In response to the initialization signal, the first receiver stores the received data in a register and modifies the received data to output a modified data to the second receiver. The second to last receivers operate in the same manner, so that different data are stored in the respective registers of the receivers. To transmit a given data to a selected one of the receivers, the transmitter outputs the given data with an identification code equal to the data stored in the register of the selected receiver. Although each of the receivers compares the received identification code with the contents of the register, only the selected receiver outputs a coincidence signal and stores the received data into a data utilization circuit thereof. A transmitter of a modified data transmission system outputs a given data together with an identification code which includes a bit of "1" at a bit position corresponding to the position of the selected receiver. Each receiver determines whether the received identification code has a "1" bit at a predetermined bit position, and if the determination is "YES" the receiver stores the received data in the data utilization circuit thereof. Each receiver also shifts the received identification code and outputs to the next receiver the shifted codes together with the received data.

14 Claims, 14 Drawing Figures

DATA TRANSMISSION SYSTEM

BACKGROUND OF THE INVENTION

1. Field of the Invention

This invention relates to a data transmission system of the type in which a transmitter selectively transmits given data to one or ones of a plurality of receivers connected to one another in a cascade fashion.

2. Prior Art

In a data transmission system in which a transmitter need transmit given data selectively to one or ones of a plurality of receivers, each receiver may be connected to the transmitter by an individual signal transmission cable. However, such a way of connection requires many signal cables and is not economical. Alternatively, the receivers may be connected to one another in series or in a cascade fashion with respect to the transmitter so that the transmitter can serially feed data to all of the receivers. In this case, each receiver is normally provided with a switch module through which its own address or identification code is assigned. And, when the transmitter need transmit given data to a specific one of the receivers, the transmitter outputs the data with an identification code of the specific receiver. The data is then stored in the receiver designated by the identification code. The latter way of connection is useful particularly in a recent electronic musical instrument in which a number of musical tone generating circuits (receivers), each formed as an LSI of an identical construction, are fed with different tone data by a single control circuit (transmitter) to produce different tones simultaneously. In this case, however, it is not desirable to provide each musical tone generating circuit with such a switch module for assigning an identification code, since the increase of switches adversely affects the reliability of the instrument and also makes the circuit and the assembling procedure thereof more complicated.

SUMMARY OF THE INVENTION

It is therefore an object of the present invention to provide a data transmission system comprising a plurality of serially connected receivers which system obviates the need for switches for assigning identification codes respectively to the receivers.

According to one aspect of the present invention, there is provided a data transmission system comprising initialization signal generating means responsive to an application of power to the transmission system for producing an initialization signal; transmitter means connected to the initialization signal generating means and including initialization data generating means responsive to the initialization signal for generating initialization data of a predetermined value and a data output terminal for transmitting the initialization data via the output terminal; and first to Nth (N: integer greater than or equal to 2) receiver means which are connected in a cascade format in the ordinal number order and connected to the initialization signal generating means wherein the nth ($1 \leq n \leq N$) receiver means comprises a nth input terminal, nth register means, nth modifying means and a nth output terminal; in the first receiver means, in response to the initialization signal, the first modifying means receiving the initialization data via the first input terminal, modifying the initialization data and delivering the modified initialization data as first output data via the first output terminal, and the first register means storing first identification data corresponding to the initialization data and identifying the first receiver means, and in the kth ($2 \leq k \leq N$) receiver means, in response to the initialization signal, the kth modifying means receiving a (k−1)th output data via the kth input terminal, modifying the (k−1)th output data and delivering the modified (k−1)th output data as kth output data via the kth output terminal and the kth register means storing kth identification data corresponding to the (k−1)th output data and identifying the kth receiver means.

According to another aspect of the present invention, there is provided a data transmission system comprising transmitter means having a data output terminal and data output means for outputting receiver indication data and given data; and first to Nth (N: integer greater than or equal to 2) receiver means which are connected in a cascade format in the ordinal number order wherein the nth ($1 \leq n \leq N$) receiver means comprises an nth input terminal, nth modifying means, nth detecting means, an nth output terminal and nth data utilization circuit means; in the first receiver means, the first modifying means receiving the receiver indication data and the given data via the nth input terminal, modifying the receiver indication data and delivering the modified receiver indication data as first output data together with the given data via the first output terminal, the first detecting means for outputting a first detection signal when the first output data satisfies a predetermined condition common to the first to Nth receiver means and the first data utilization circuit means utilizing the given data when the first detection signal is outputted, and in the kth ($2 \leq k \leq N$) receiver means, the kth modifying means receiving a (k−1)th output data via the kth input terminal, modifying the (k−1)th output data and delivering the modified (k−1)th output data as kth output data together with the given data via the kth output terminal, the kth detecting means for outputting a kth detection signal when the kth output data satisfies the predetermined condition and the kth data utilization circuit means utilizing the given data when the kth detection signal is outputted.

DESCRIPTION OF THE PREFERRED EMBODIMENTS OF THE INVENTION

Figure 1:
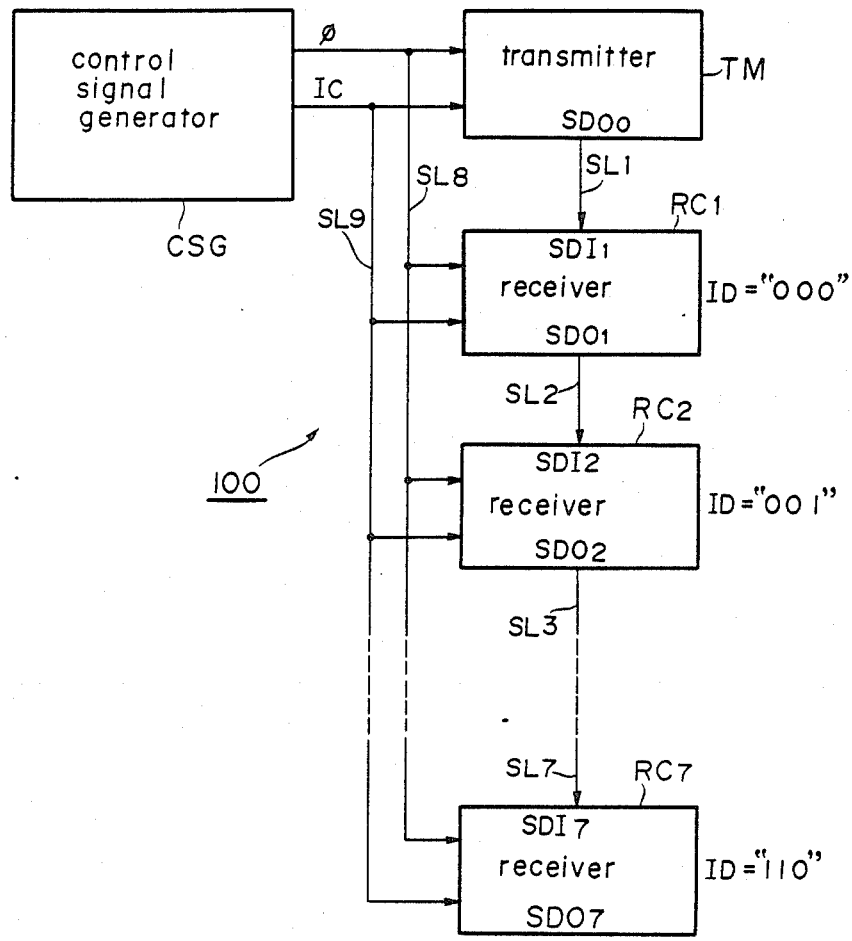
FIG. 1 is a block diagram of a data transmission system 100 provided in accordance with the present invention.

FIG. 1 shows a block diagram of a data transmission system 100 provided in accordance with the present invention. The data transmission system 100 comprises a transmitter TM, seven receivers $RC_1$ to $RC_7$ and a control signal generator CSG. The transmitter TM has a data output terminal $SDO_0$ from which information in the form of serial data is outputted. Each of the receivers $RC_1$ to $RC_7$ is provided with a data input terminal SDI and a data output terminal SDO. The data output terminal $SDO_0$ of the transmitter TM is connected via a signal line SL1 to the data input terminal $SDI_1$ of the first receiver $RC_1$ and the data output terminal $SDO_1$ of this receiver $RC_1$ is connected via a signal line SL2 to the data input terminal $SDI_2$ of the second receiver $RC_2$. In a similar manner, the data output terminal $SDO_2$ of the second receiver $RC_2$ is connected via a signal line SL3 to the data input terminal $SDI_3$ of the third receiver $RC_3$ (not shown), . . . , and the data output terminal $SDO_6$ of the sixth receiver $RC_6$ (not shown) is connected via a signal line SL7 to the data input terminal $SDI_7$ of the last receiver $RC_7$. Thus, the transmitter TM and receivers $RC_1$ to $RC_7$ are serially connected by the signal lines SL1 to SL7. In this case, the receivers $RC_1$, $RC_2$, . . . and $RC_7$ are assigned three-bit identification codes "000" (or "0" in decimal), "001" (or "1" in decimal), . . . and "110" (or "6" in decimal), respectively. A signal line SL8 is provided for simultaneously supplying a clock pulse $\phi$, outputted from the control signal generator CSG, to all of the transmitter TM and receivers $RC_1$ to $RC_7$. Another signal line SL9 is provided for simultaneously feeding an initial clear signal IC, which is outputted from the control signal generator CSG when this data transmission is energized, to all of the transmitter TM and receivers $RC_1$ to $RC_7$.

Figure 2:
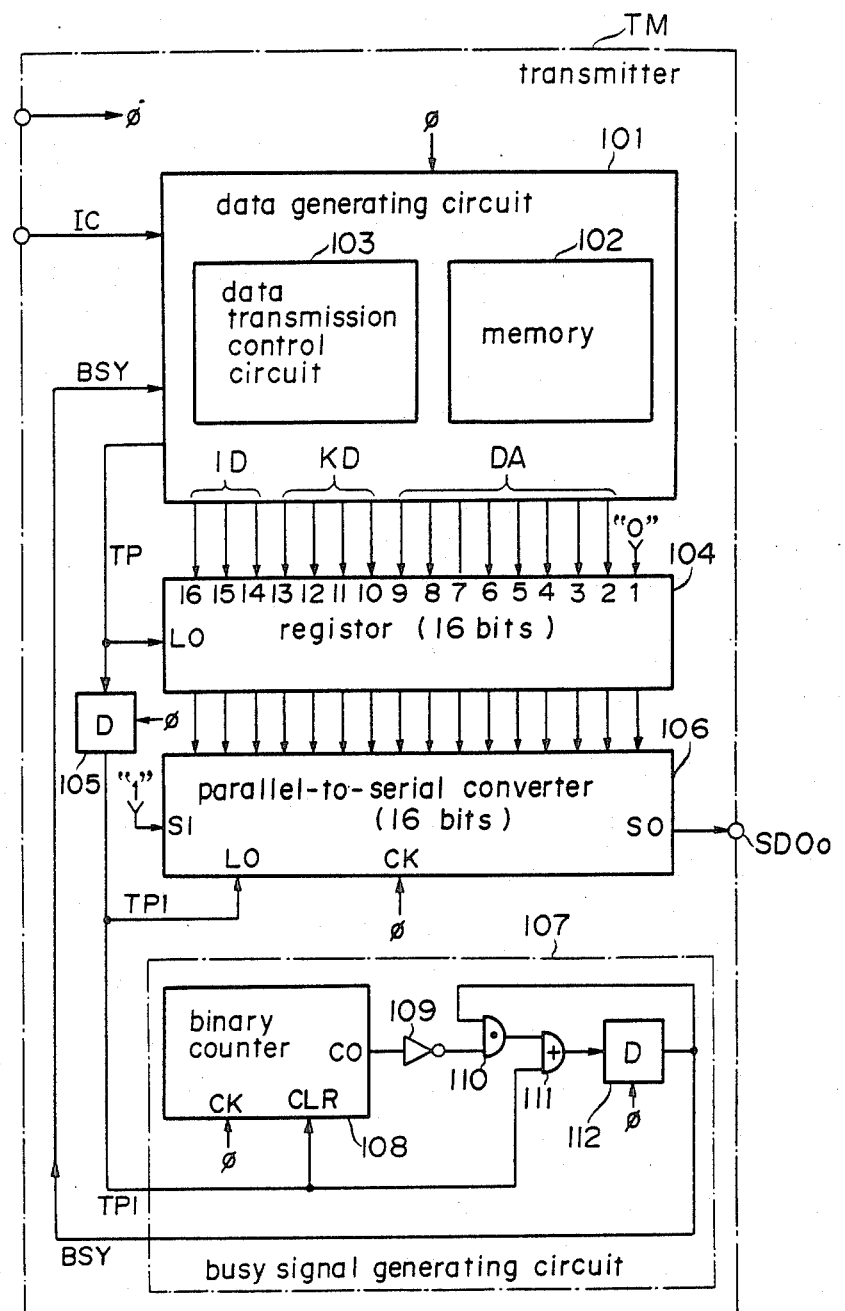
FIG. 2 is a circuit diagram of the transmitter TM of the data transmission system 100 of FIG. 1.

The transmitter TM includes, as shown in FIG. 2, a data generating circuit 101 for generating information to be transmitted to the receivers $RC_1$ to $RC_7$. The data generating circuit 101 comprises a memory 102, in which data to be supplied to the receivers $RC_1$ to $RC_7$ is stored, and a data transmission control circuit 103 for controlling the transmission of the data stored in the memory 102. This data generating circuit 101 is constructed so as to read an eight-bit data DA, to be transmitted to a receiver $RC_n$ ("n" is any one of "1" to "7"), from the memory 102 and to add to this read data DA a four-bit kind code KD and a three-bit identification code ID to form a fifteen-bit data to be outputted to a sixteen-bit register 104. In this case, the kind code KD indicates the kind of the data DA, while the identification code ID indicates one of the receivers $RC_1$ to $RC_7$ to which the data DA is to be transmitted. The data generating circuit 101 also outputs a pulse signal TP simultaneously with the output of the fifteen-bit data. The register 104 has sixteen stages, and the fifteen-bit data outputted from the data generating circuit 101 is applied to the second to sixteenth stages thereof. The first stage of the register 104 is always supplied with data of "0". The fifteen-bit data and the data of "0" are loaded into the register 104 when the pulse TP is applied to a load terminal LO thereof, and appear at output terminals of the register 104. The pulse signal TP is also supplied to a delay flip-flop (hereinafter referred to as "DFF") 105 which causes the supplied pulse signal TP to be delayed by a time period equal to the period of the clock signal $\phi$ or one bit time and outputs the delayed pulse signal TP as a pulse signal TP1. The sixteen-bit output data of the register 104 is loaded into a parallel-to-serial converter 106 composed of a sixteen-stage presettable shift register when the pulse signal TP1 is applied to a load terminal LO of the parallel-to-serial converter 106. When the signal TP1 at the load terminal LO is in the state of "0", the parallel-to-serial converter 106 shifts its contents out from an output terminal SO thereof in synchronism with the clock signal $\phi$ supplied to a clock terminal CK of the parallel-to-serial converter 106, and the data thus shifted out from the output terminal SO is supplied to an output terminal $SDO_0$ of the transmitter TM. An input terminal SI of the parallel-to-serial converter 106 is always supplied with a "1" signal, so that "1" is shifted into the parallel-to-serial converter 106 when the signal TP1 is in the state of "0". The pulse signal TP1 is also supplied to a busy signal generating circuit 107 which generates a busy signal BSY to be supplied to the data generating circuit 101. The busy signal BSY is rendered "1" at the leading edge of the pulse signal TP1 and is rendered "0" thirty two bit-times after the same leading edge (see FIG. 4(f)). The busy signal generating circuit 107 comprises a five-stage binary counter 108, an inverter 109, an AND gate 110, an OR gate 111 and a DFF 112. The counter 108 is cleared when the pulse signal TP1 of "1" is applied to a clear terminal CLR thereof, counts up the clock pulse $\phi$ supplied to a clock terminal CK thereof, and outputs a "1" signal from its output terminal CO when the contents thereof reach "31". The DFF 112 is set to "1" by the pulse signal TP1 and holds the "1" state until the signal of "1" is outputted from the output terminal CO of the counter 108, so that the time duration of the busy signal BSY outputted from the DFF 112 is equal to thirty two bit-times. This busy signal BSY of "1" inhibits the data generating circuit 101 from outputting the next fifteen-bit data.

Figure 3:
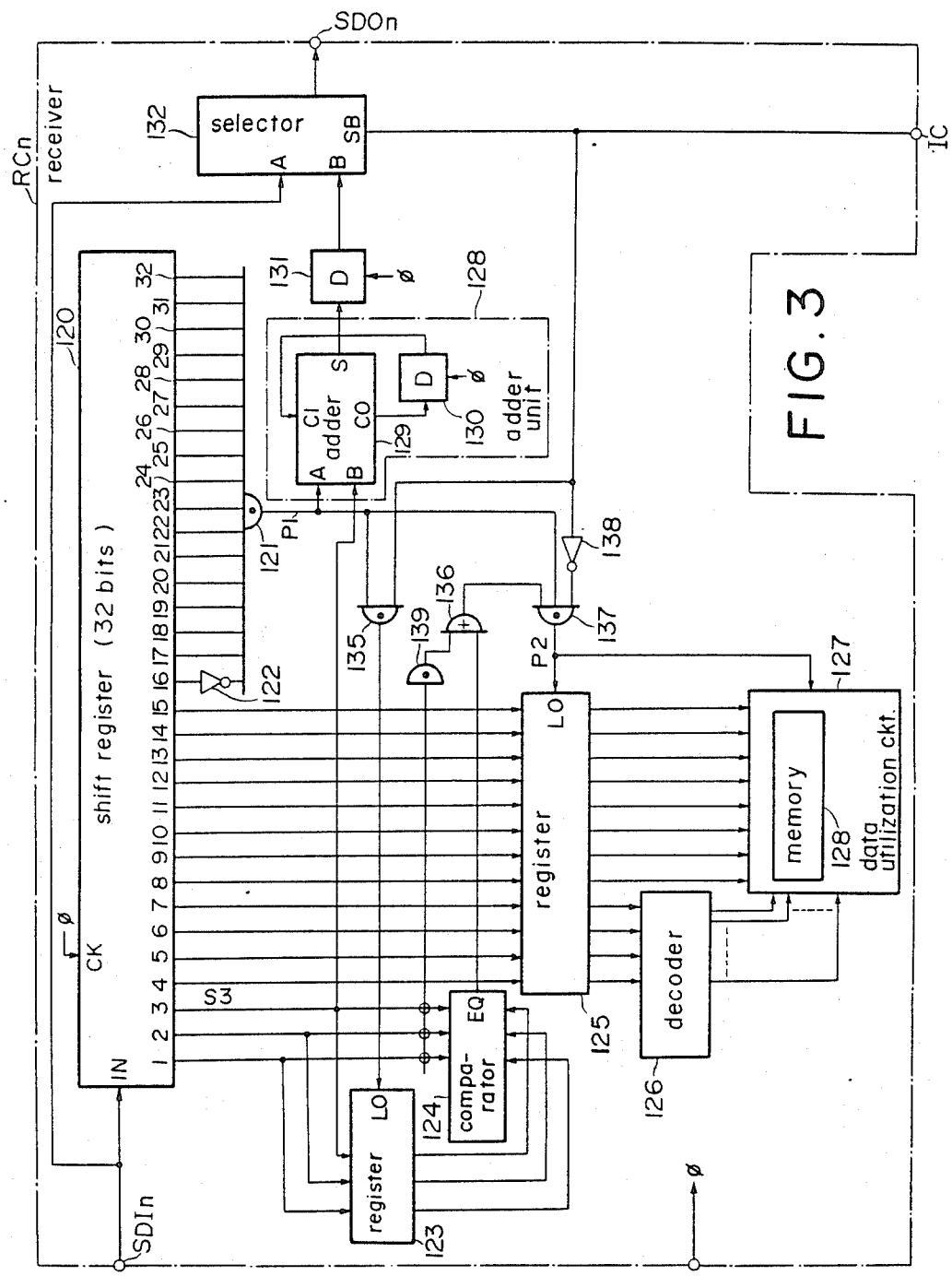
FIG. 3 is a circuit diagram of the receiver $RC_n$ ("n" is any one of "1" to "7") of the data transmission system 100 of FIG. 1.

The receiver $RC_n$ ("n" is any one of "1" to "7") has, as shown in FIG. 3, a 32-stage shift register 120 which is composed of thirty two flip-flops. The serial data supplied to the data input terminal $SDI_n$ is shifted into the shift register 120 in accordance with the clock signal $\phi$ supplied to a clock terminal CK thereof. A seventeen-input AND gate 121 is provided for producing a signal P1 of "1" when all of the seventeenth to thirty second stages of the shift register 120 output "1" signals and when the sixteenth stage of the shift register 120 outputs a "0" signal to an inverter 122. This signal P1 of "1" indicates that a signal of "1" of at least sixteen consecutive bit-times and a "0" signal of one bit-time (see the "0" signal loaded into the first stage of the register 104)

have been successively supplied to the data input terminal $SDI_n$, and also indicates that the serial data of fifteen consecutive bits following the "0" signal is the fifteen-bit data outputted from the data generating circuit 101, i.e., the data DA, the kind code KD and the identification code ID. Thus, the signal P1 becomes "1" when the first to fifteenth stages of the shift register 120 contain the identification code ID, the kind code KD and the data DA. The signal of "0" which precedes the fifteen-bit data is hereinafter referred to as "start bit".

Output terminals of the first to third stages of the shift register 120 are connected to a three-bit register 123 into which the identification code ID is stored by an initializing operation which takes place when this data transmission system 100 is energized to start to operate. A comparator 124 is provided for comparing the identification code ID held in the register 123 with the identification code shifted into the first to third stages of the shift register 120. When the two identification codes coincide to each other, the comparator 124 outputs a coincidence signal of "1" from an output terminal EQ thereof. Connected to the fourth to fifteenth stages of the shift register 120 is a twelve-bit register 125 into which the kind code KD and the data DA are stored when a signal P2 is supplied to a load terminal LO thereof. Shown at 126 is a decoder which decodes the kind code contained in the register 125 and outputs signals representative of the result of the decoding to a data utilization circuit 127. This data utilization circuit 127 detects from the signal P2 the fact that the kind code KD and data DA are present in the register 125 and stores the data DA into an area of its internal memory 128 which is designated by the output signals of the decoder 126. This data utilization circuit 127 then processes the stored data DA. Shown at 128 is an adder unit which comprises an adder 129 and a DFF 130. This adder unit 128 is so designed as to add "1" to the identification code ID shifted into the shift register 120 during the initializing operation and to output the addition result through a DFF 131 to one input terminal B of a selector 132. The adder 129 has a pair of data input terminals A and B, an output terminal S for outputting the result of addition, a carry output terminal CO and a carry input terminal CI. The selector 132 outputs the data at the input terminal B to the output terminal $SDO_n$ when the initial clear signal IC applied to a selection terminal SB thereof is in the state of "1", that is to say, when the power is supplied to this data transmission system 100. On the other hand, when the signal IC is in the state of "0", the selector 132 outputs data at the other input terminal A thereof, i.e., the data supplied to the input terminal $SDI_n$, to the output terminal $SDO_n$.

The operation of this data transmission system 100 will now be described with reference to a timing chart shown in FIG. 4.

(1) Initializing operation

When the power is supplied to this data transmission system 100, the initializing operation takes place and the identification codes ID of "000" to "110" are loaded respectively into the registers 123 of the receivers $RC_1$ to $RC_7$ in the following manner.

Figure 4:
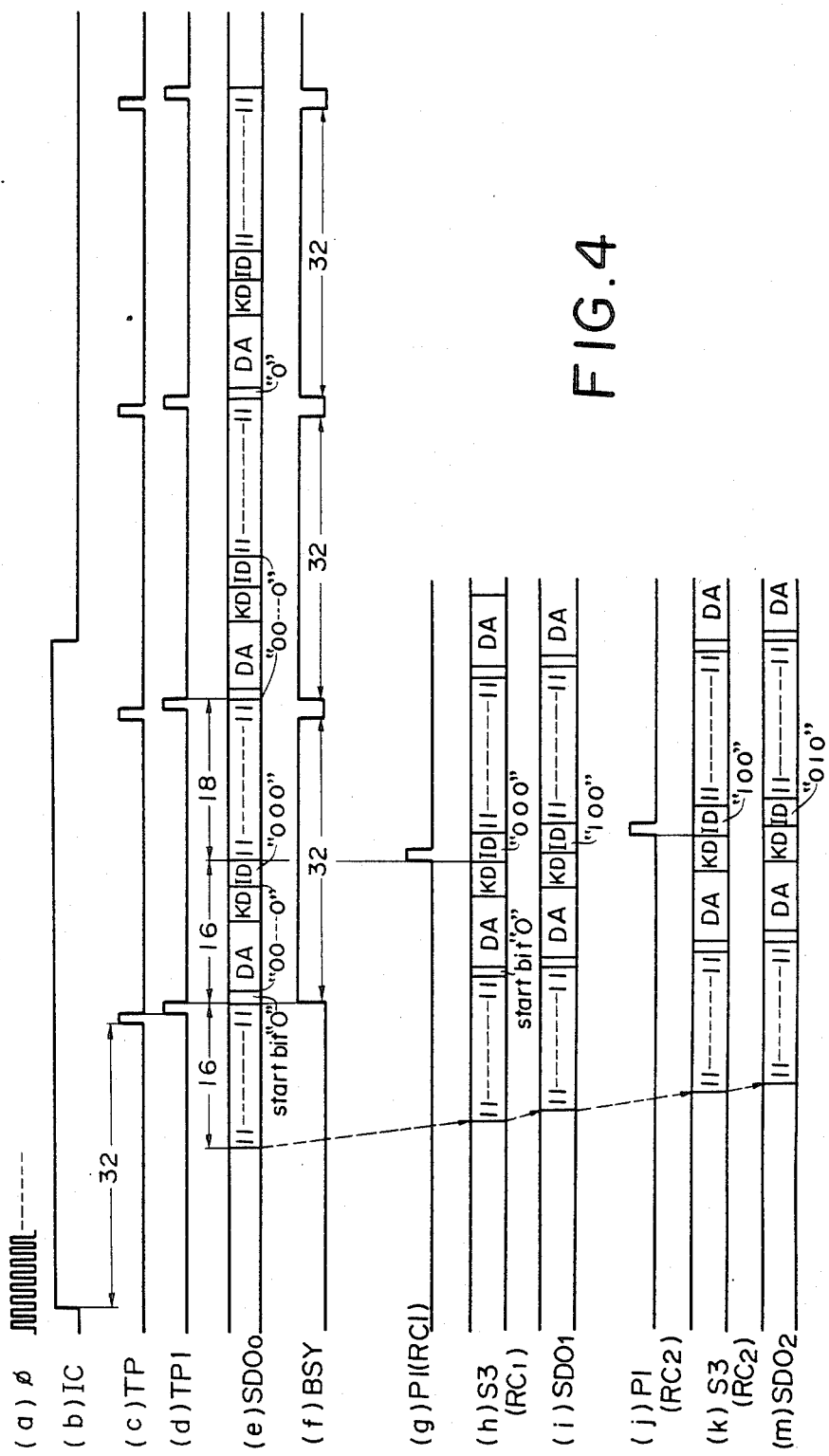
FIG. 4 is a timing chart of the various signals appearing in the transmitter TM and receiver $RC_n$ of FIGS. 2 and 3.

When the power is supplied, the control signal generator CSG shown in FIG. 1 begins to output the clock signal $\phi$ shown in FIG. 4-(a), and then outputs the initial clear signal IC shown in FIG. 4-(b). The initial clear signal IC of "1" has a time duration of 75 bit-times in this embodiment, and the loading of the identification codes ID into the respective receivers $RC_1$ to $RC_7$ is effected during the time when this signal IC is held in the "1" state. When the signal IC is rendered "1", the data generating circuit 101 detects this and begins to measure time to detect a lapse of 32 bit-times. During this measurement of time, the sixteen-bit data initially present in the parallel-to-serial converter 106 is serially outputted to the output terminal $SDO_0$ and then data of sixteen "1" bits shifted into the parallel-to-serial converter 106 is serially outputted to the output terminal $SDO_0$. Upon detecting the lapse of 32 bit-times, the data generating circuit 101 outputs the identification code ID of "000" together with the kind code KD and the data DA both of which are composed of "0" bits. At the same time, the data generating circuit 101 outputs the pulse signal TP (see FIG. 4-(c)) whereupon "0" is loaded into each of the stages of the register 104. The contents of the register 104, i.e., data composed of sixteen "0" bits, are loaded into the parallel-to-serial converter 106 when the DFF 105 outputs the pulse signal TP1 (FIG. 4-(d)) one bit time after the signal TP, and the data thus loaded into the converter 106 is serially outputted to the output terminal $SDO_0$ (see FIG. 4-(e)). On the other hand, when the pulse signal TP1 falls, the busy signal BSY is rendered "1", as shown in FIG. 4-(f), and is kept in the "1" state for 32 bit-times. Thus, during the time when the busy signal is "1", the data of sixteen bits of "0" is serially outputted from the output terminal $SDO_0$ and then data of sixteen bits of "1" is serially outputted from the output terminal $SDO_0$.

Then, the busy signal BSY is rendered "0" whereupon the data generating circuit 101 again outputs data of fifteen "0" bits and at the same time outputs the pulse signal TP. And thereafter an operation similar to the above-described operation is carried out. This second output of the data of "0" bits is effected since the duration of the signal IC is much greater than that of the busy signal BSY in this embodiment, however this second output is not essential to this system 100. Transmission of data to the receivers $RC_1$ to $RC_7$ is enabled when the busy signal BSY is again rendered "0". More specifically, during the time when the above-described operation is carried out, the predetermined identification codes ID are set to the receivers $RC_1$ to $RC_7$, respectively.

The initializing operation of the receivers $RC_1$ to $RC_7$ will now be described.

The serial data (FIG. 4-(e)) outputted from the output terminal $SDO_0$ of the transmitter TM is supplied through the input terminal $SDI_1$ to an input terminal IN of the shift register 120 of the first receiver $RC_1$ and is shifted thereinto. When the data of sixteen "1" bits is stored in the seventeenth to thirty second stages of the shift register 120 with the start bit of "0" being stored in the sixteenth stage of the shift register 120, the pulse signal P1 is outputted from the AND gate 121 as shown in FIG. 4-(g). In this case, the data DA (eight "0" bits), the kind code KD (four "0" bits) and the identification code ID of "000" are stored respectively in the eighth to fifteenth stages, the fourth to seventh stages and the first to third stages of the shift register 120. At this time, the initial clear signal IC is in the "1" state, so that the AND gate 135 opens. As a result, the signal P1 is supplied to the load terminal LO of the register 123 through the AND gate 135, and therefore the identification code ID of "000" is stored in the register 123 the receiver $RC_1$.

On the other hand, the data shifted into the shift register 120 of the receiver $RC_1$ is serially outputted from the third stage thereof as data S3 and supplied to the input terminal B of the adder 129 as shown in FIG. 4-(h). When the signal P1 is "0" the serial data S3 supplied to the adder 129 passes through the adder 129 and is supplied to the DFF 131. This data is then delayed at the DFF 131 by one bit-time and is outputted through the selector 132 to the output terminal $SDO_1$. In other words, when the signal P1 is in the state of "0" the data supplied to the input terminal $SDI_1$ is delayed by four bit-times and is outputted from the output terminal $SDO_1$ (see FIG. 4-(i)). It will be appreciated that the DFF 131 is provided for the purpose of synchronizing the data with the clock pulse $\phi$. As described above, when the identification code ID is stored in the first to third stages of the shift register 120, the signal P1 of "1" is generated and supplied to the input terminal A of the adder 129. As a result, "1" is added to the LSB of the identification code ID at the adder 129, and if a carry signal is generated as a result of the addition the carry signal is delayed at the DFF 130 by one bit-time and is supplied to the carry input terminal CI of the adder 129. In the first receiver $RC_1$, the carry signal is not generated since the LSB of the identification ID of "000" is "0". Thus, data "1" is added to the identification code ID by the adder unit 128 of the receiver $RC_n$ to create the identification code ID for the next receiver $RC_{n+1}$. The new identification code ID of "001" thus created in the first receiver $RC_1$ is supplied through the DFF 131 and the selector 132 to the data output terminal $SDO_1$ (see FIG. 4-i)).

As described above, the first receiver $RC_1$ stores the identification code ID of "000" outputted from the data generating circuit 101 of the transmitter TM into the register 123 thereof and also adds "1" to the identification code ID of "000" to create the new identification code ID of "001" to be outputted to the second receiver $RC_2$.

The operation of each of the second to seventh receivers $RC_2$ to $RC_7$ is similar to the above-described operation of the first receiver $RC_1$. More specifically, the receiver $RC_n$ stores the identification code ID supplied from the preceding stage receiver $RC_{n-1}$ into the register 123 thereof. The receiver $RC_n$ also adds "1" to the received identification code ID to create the new identification code ID and outputs the new identification code ID to the succeeding-stage receiver $RC_{n+1}$. FIGS. 4-(j), 4-(k) and 4-(m) respectively show the signal P1 in the second receiver $RC_2$, the output data of the third stage of the shift register 120 of the second receiver $RC_2$ and the data at the data output terminal $SDO_2$.

(2) Normal operation

When the loading of the respective identification codes ID into the $RC_1$ to $RC_7$ receivers by the above-described initializing operation has been completed and when the initial clear signal IC is rendered "0", each of the receivers $RC_1$ to $RC_7$ is enabled to receive data.

In the case where it is desired that the transmitter TM send a given data DA to a specific one of the receivers $RC_1$ to $RC_7$, the data generating circuit 101 of the transmitter TM outputs the data DA together with the kind code KD representative of the kind of the data DA and the identification code ID indicating the specific receiver RC to which the data DA should be sent. At the same time, the data generating circuit 101 outputs the pulse signal TP whereupon the fifteen-bit data outputted from the data generating circuit 101 is stored in the register 104, as described before, and then is loaded into the parallel-to-serial converter 106 together with the start bit of "0". The data and the start bit of "0" thus loaded into the parallel-to-serial converter 106 are serially outputted therefrom to the data output terminal $SDO_0$. It should be noted that at least sixteen consecutive bits of "1" have certainly been outputted from the output terminal $SDO_0$ before the data and the start bit of "0" in the parallel-to-serial converter 106 are outputted from the output terminal $SDO_0$. More specifically, the data in the parallel-to-serial converter 106, which includes the start bit of "0" and the identification code ID, is composed of sixteen bits, whereas the busy signal BSY has a time duration equal to 32 bit-times (FIG. 4-(f)), so that at least sixteen consecutive bits of "1" are always outputted immediately after the serial output of the sixteen-bit data from the parallel-to-serial converter 106.

The data outputted from the data output terminal $SDO_0$ of the transmitter TM is supplied through the data input terminal $SDI_1$ of the receiver $RC_1$ to the shift register 120 of the receiver $RC_1$ and is shifted thereinto. At the same time, the data outputted from the data output terminal $SDO_0$ of the transmitter TM is supplied through the selector 132 and output terminal $SDO_1$ of the receiver $RC_1$ to the shift register 120 of the receiver $RC_2$. In a similar manner, the data outputted from the data output terminal $SDO_0$ is supplied to the respective registers 120 of the receivers $RC_3$ to $RC_7$. And the pulse signals P1 are outputted from the respective AND gates 121 of the receivers $RC_1$ to $RC_7$ when the sixteen bits of "1" are stored in the thirty second to seventeenth stages of the shift registers 120 of the receivers $RC_1$ to $RC_7$ with the start bit of "0" being stored in the sixteenth stages of the shift registers 12, the data DA in the eighth to fifteenth stages, the kind code KD in the fourth to seventh stages and the identification code ID in the first to third stages. At this time, the comparator 124 of each one of the receivers $RC_1$ to $RC_7$ compares the identification code ID in the register 123 with the identification code ID stored in the first to third stages of the shift register 120. Assuming that the identification code ID outputted from the data generating circuit 101 of the transmitter TM is "010", only the comparator 124 of the third receiver $RC_3$ outputs the coincidence signal of "1". This coincidence signal is supplied through the OR gate 136 to the first input terminal of the AND gate 137. At this time, the initial clear signal IC is in the "0" state and therefore the output signal of the inverter 138 is "1", so that the AND gate 137 is enabled to open by the coincidence signal whereupon the aforesaid signal P1 passes through this AND gate 137 and is supplied to the load terminal LO of the register 125 as the signal P2. As a result, the data DA and the kind code KD contained in the shift register 120 are loaded into the register 125 of the receiver $RC_3$. The data utilization circuit 127 detects, in accordance with the signal P2, the fact that the data DA and the kind code KD have been loaded into the register 125, and stores the loaded data DA in that area of the memory 128 which is designated by the output of decoder 126.

The foregoing is the operation of the system by which a given data is sent from the transmitter TM to a selected one of the receivers $RC_1$ to $RC_7$.

The operation of this system to transfer the same data from the transmitter to all of the receivers $RC_1$ to $RC_7$ will now be described.

In this case, the data generating circuit 101 of the transmitter TM outputs the data DA and the kind code KD together with the identification code ID of "111" which is not included in those of the identification codes ID which are assigned to the receivers $RC_1$ to $RC_7$. When the identification code ID of "111" is inputted to the first to third stages of the respective shift registers 120 of the receivers $RC_1$ to $RC_7$, each of three-input AND gates 139 of the receivers $RC_1$ to $RC_7$ outputs a "1" signal through the OR gate 136 to the first input terminal of the AND gate 137. As a result, the AND gate 137 opens, so that the signal P1 is transferred through this AND gate 137 to the load terminal LO of the register 125. Thus, in the case of the identification code ID of "111", the data DA and the kind code KD contained in each of the shift registers 120 of the receivers $RC_1$ to $RC_7$ are stored in the register 125.

In the above embodiment, the receivers $RC_1$ to $RC_7$ are assigned the identification codes "000" to "110", respectively, however any values can be assigned to the receivers $RC_1$ to $RC_7$ as their identification codes ID. For example, the receivers $RC_1$ to $RC_7$ may be assigned identification codes ID of "110" to "000", respectively. With the above-described data transmission system 100, each of the receivers $RC_1$ to $RC_7$ is so constructed that the adder unit 128 forms the new identification code ID for the succeeding-stage receiver by adding "1" to the identification code ID received from the preceding-stage receiver. However, any kind of operation unit such as a subtractor or a code converter can be used in place of the adder unit 128. Furthermore, the value to be added to or subtracted from the identification code ID received from the preceding-stage receiver to create the new identification code ID for the succeeding-stage receiver may be any values other than "1".

A modified data transmission system 100a provided in accordance with the present invention will now be described with reference to FIGS. 5 to 8 in which elements corresponding to those of the aforesaid data transmission system 100 are denoted by like reference numerals with suffixes a.

Figure 5:
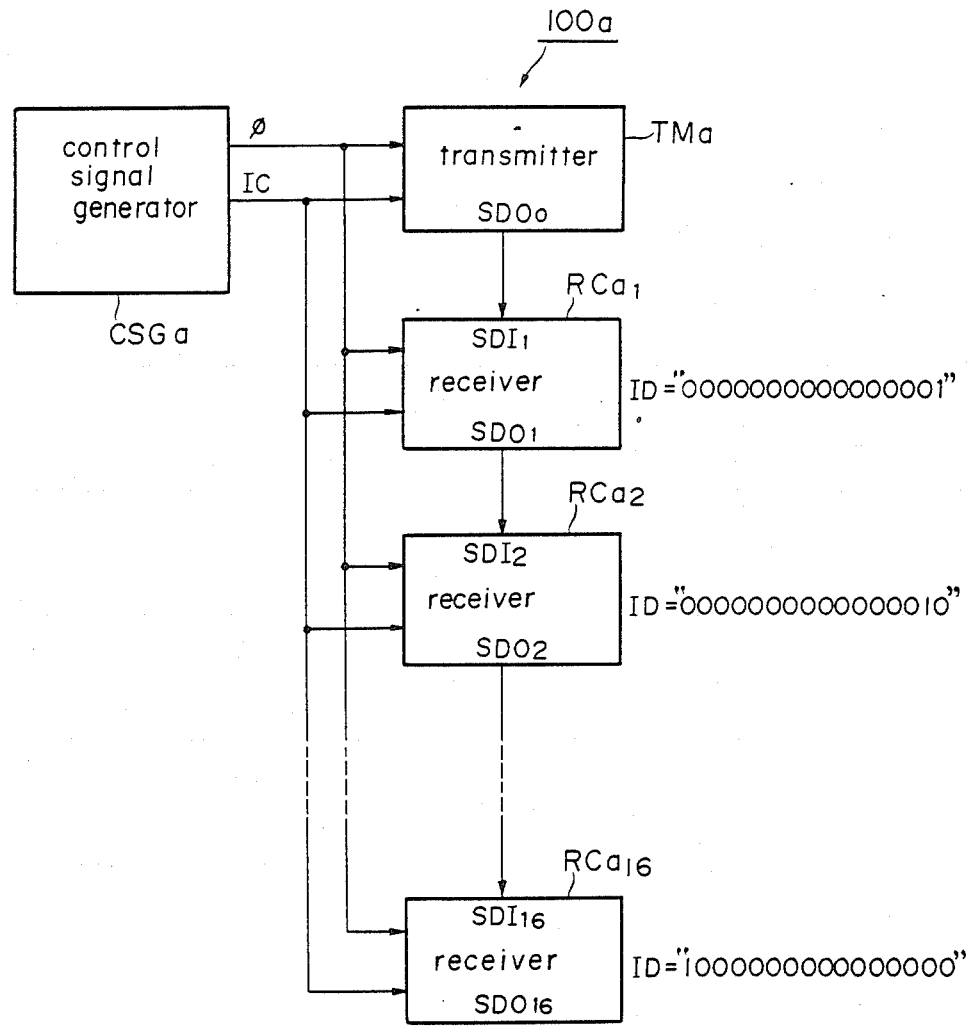
FIG. 5 is a block diagram of a modified data transmission system 100a provided in accordance with the present invention.

As shown in FIG. 5, this modified data transmission system 100a is similar in construction to the data transmission system 100 shown in FIG. 1 but differs therefrom in the following respects. The data transmission system 100 shown in FIG. 1 comprises seven receivers $RC_1$ to $RC_7$ whereas the modified data transmission system 100a comprises sixteen receivers $RCa_1$ to $RCa_{16}$. The modified data transmission system 100a employs sixteen-bit identification codes ID each of which includes only one bit of "1", and the receivers $RCa_1$, $RCa_2$, $RCa_3$, ... and $RCa_{16}$ are assigned the identification codes of "0000000000000001", "0000000000000010", "0000000000000100", "0000000000001000", ... "1000000000000000", respectively. Each kind code KD employed in the modified data transmission system 100a is composed of eight bits, and each of the receivers $RCa_1$ to $RCa_{16}$ detects a start bit of "0" to locate data to be received in a manner different from that of the aforesaid data transmission system 100.

Figure 6:
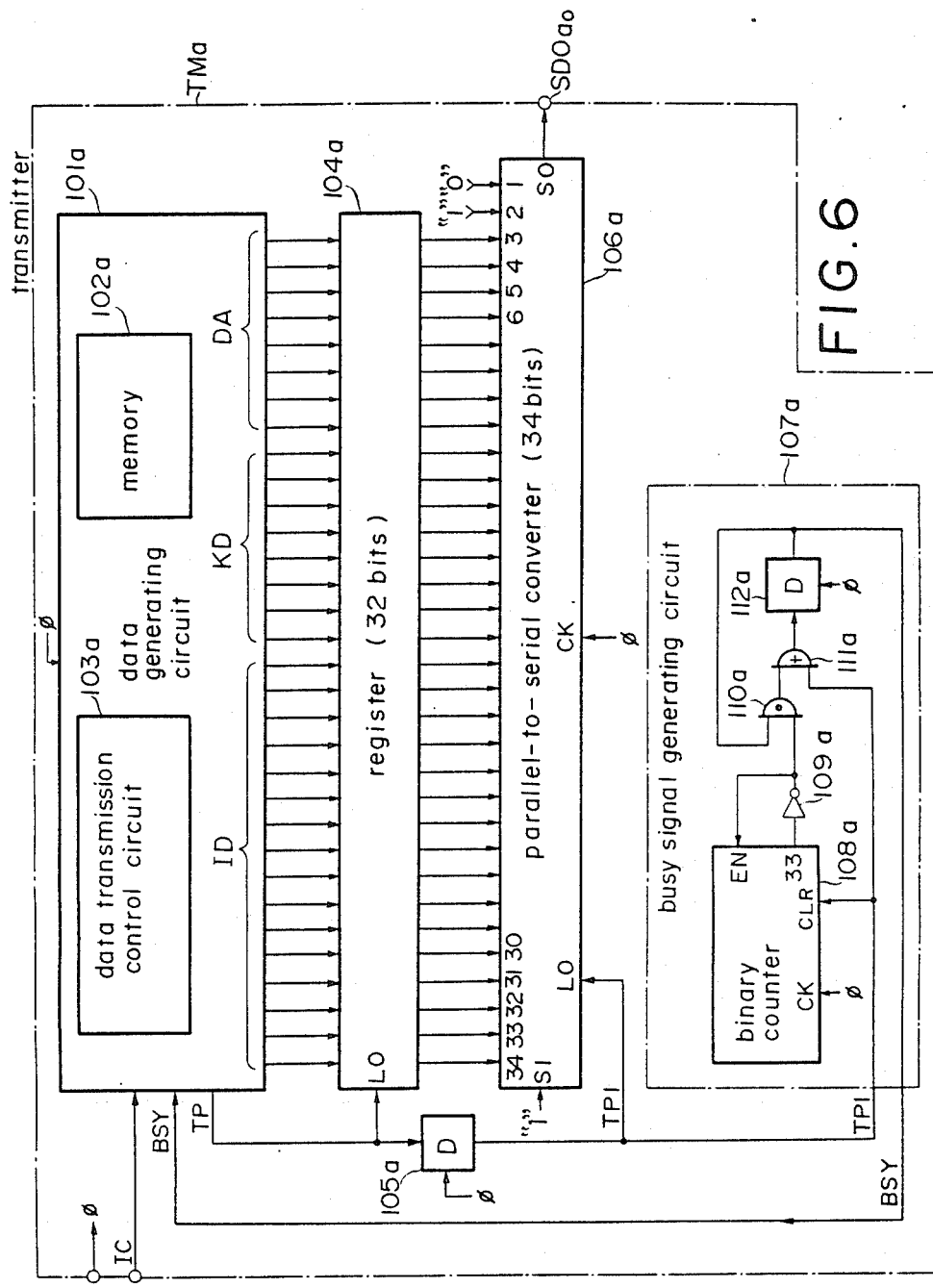
FIG. 6 is a circuit diagram of the transmitter TMa of the data transmission system 100a of FIG. 5.
Figure 7:
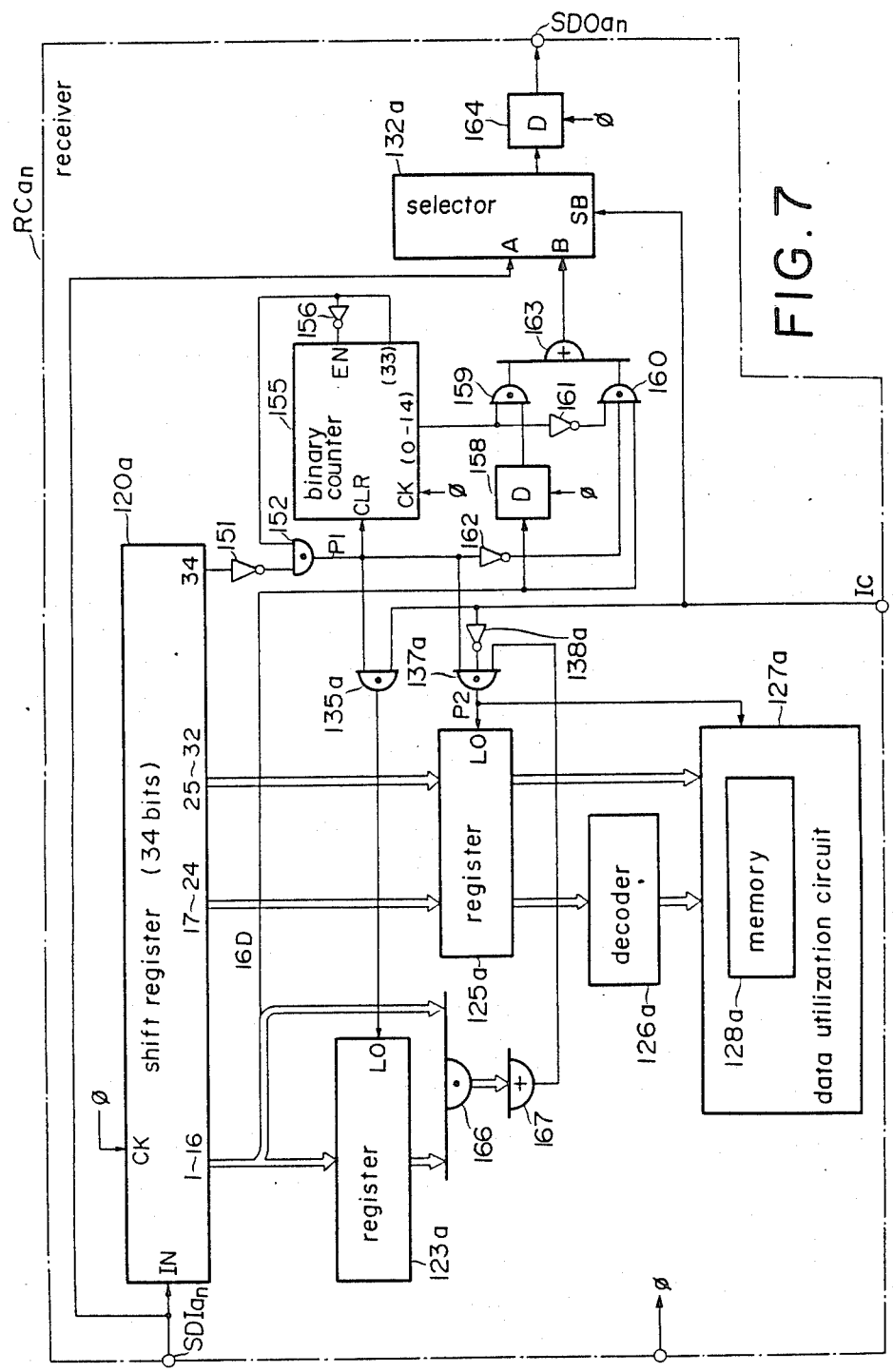
FIG. 7 is a circuit diagram of the receiver $RCa_n$ ("n" is any one of "1" to "16") of the data transmission system 100a of FIG. 5.

The operation of this modified data transmission system 100a will now be described with reference to circuit diagrams shown in FIGS. 6 and 7 and a timing chart shown in FIG. 8.

(a) Initializing operation

Figure 8:
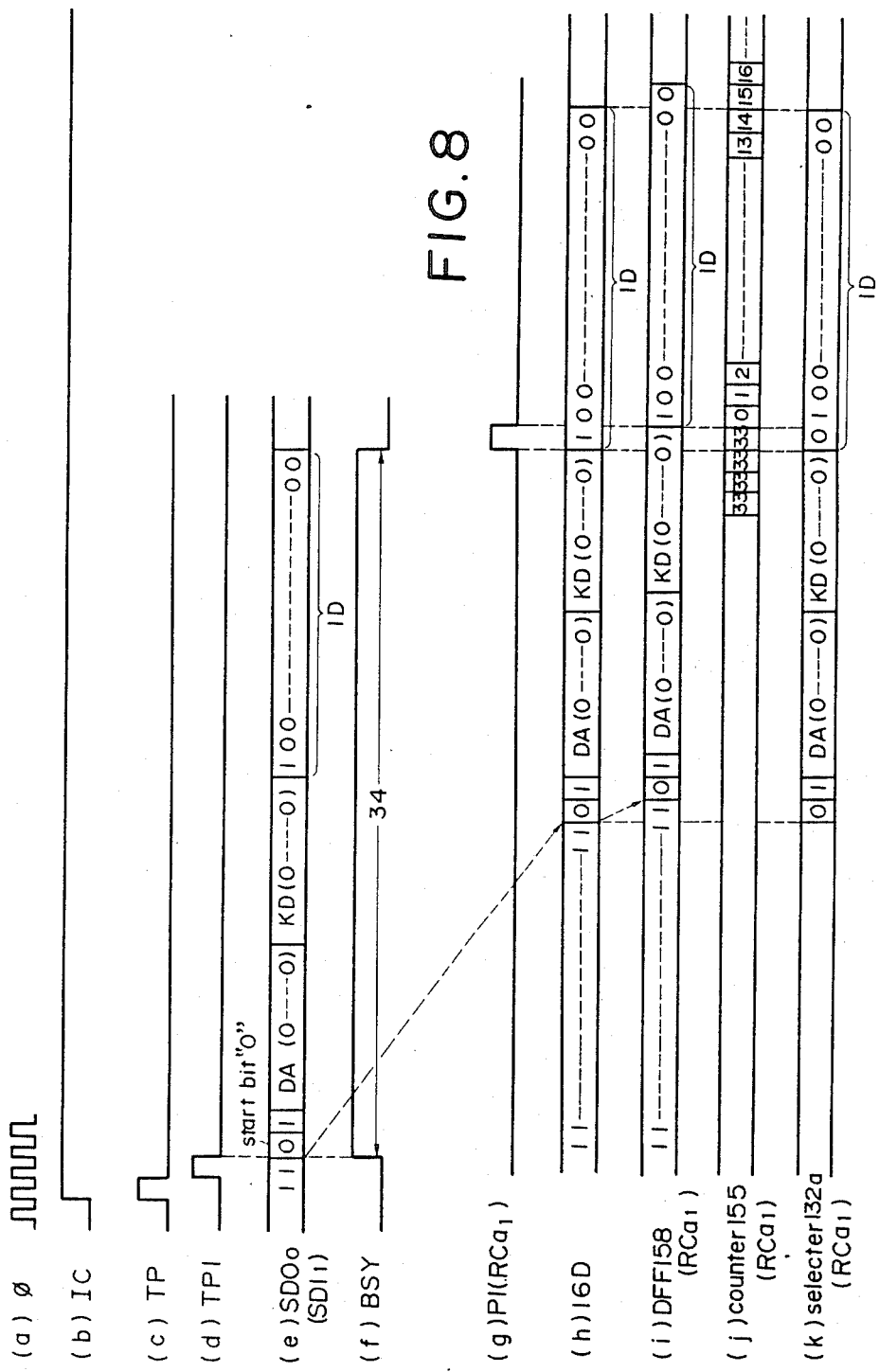
FIG. 8 is a timing chart of the various signals appearing in the transmitter TMa and receiver $RCa_n$ of FIGS. 6 and 8.

When the power is supplied to this data transmission system 100a, the control signal generator CSGa shown in FIG. 5 begins to output a clock signal $\phi$ as shown in FIG. 8-(a), and then outputs an initial clear signal IC as shown in FIG. 8-(b). The clock signal $\phi$ and the initial clear signal IC are supplied to the transmitter TMa and the receivers $RCa_1$ to $RCa_{16}$. The initial clear signal IC has a time duration of more than 292 bit-times. When the initial clear signal IC is supplied to a data generating circuit 101a of the transmitter TMa shown in FIG. 6, the data generating circuit 101a outputs an eight-bit data DA of "00000000" (or "11111111") together with the eight-bit kind code KD of "00000000" (or "11111111") and the sixteen-bit identification ID of "0000000000000001" to a 32-bit register 104a. At the same time, the data generating circuit 101a outputs a pulse signal TP (see FIG. 8-(c)), whereupon the 32-bit data composed of the data DA, the kind code KD and the identification code ID is loaded into the register 104a. The 32-bit data thus loaded into the register 104a is then stored in a 34-stage parallel-to-serial converter 106a when a pulse signal TP1 is outputted from a DFF 105a. At this time, a signal of "0" (start bit of "0") and a signal of "1" applied respectively to input terminals of the first and second stages of the parallel-to-serial converter 106a are also stored thereinto. Then, the thus stored 34-bit data is serially outputted from the parallel-to-serial converter 106a in accordance with the clock pulse $\phi$ and is supplied via a data output terminal $SDOa_0$ of the transmitter TMa to a data input terminal $SDIa_1$ of the first receiver $RCa_1$.

On the other hand, when the pulse signal TP1 is supplied to the busy signal generating circuit 107a, a busy signal BSY (FIG. 8-(f)) is rendered "1" at the leading edge of the pulse signal TP1 and is held in the "1" state for 34 bit-times. During the time when this busy signal BSY is in the "1" state, the data generating circuit 101a is inhibited from outputting the next data. The busy signal generating circuit 107a comprises a binary counter 108a which counts up the clock pulse $\phi$, and outputs a "1" signal from a terminal [33] thereof when the count of the clock signal $\phi$ reaches "33". This counter 108a is cleared when the pulse signal TP1 applied to a clear terminal CLR thereof falls to "0" and counts the clock signal $\phi$ only when a "1" signal is applied to an enable terminal EN thereof.

The data serially supplied to the data input terminal $SDIa_1$ of the receiver $RCa_1$ is shifted into a 34-stage shift register 120a thereof in accordance with the clock pulse $\phi$. When the start bit of "0" contained in the serial data is stored in the thirty fourth stage of the shift register 120a, an inverter 151 outputs a "1" signal to one input terminal of a two-input AND gate 152. The other input terminal of the AND gate 152 is supplied with a signal outputted from an output terminal [33] of a binary counter 155. This binary counter 155 counts the clock pulse $\phi$ only when a "1" signal is applied to an enable terminal EN thereof, and is cleared when a pulse signal P1 supplied from the AND gate 152 to a clear terminal CLR thereof falls to "0". The counter 155 outputs a "1" signal from an output terminal [0–14] thereof when the contents of the counter 155 are between "0" and "14", and outputs a "1" signal from the output terminal [33] thereof when the contents of the counter 155 are equal to "33". When the power is supplied to this system 100a, the counter 155 begins to count the clock signal $\phi$, and when the count value of the clock pulse $\phi$ reaches "33" a "1" signal is outputted from an inverter 156, so that the counter 155 stops the count operation. And thereafter, the counter 155 continues to output the "1" signal from the output terminal [33] and waits for the start bit of "0" to be outputted from the thirty fourth stage of the shift register 120*a*. The shift register 120*a* is so designed that all of the stages thereof are set to "1" states when the power is supplied to this system 100*a*, that is to say, when the initial clear signal IC rises. And therefore, the inverter 151 never outputs a "1" signal before the start bit of "0" is stored in the 34th stage of the shift register 120*a*.

When the start bit of "0" is stored in the 34th stage of the shift register 120*a*, the inverter 151 outputs the "1" signal, so that the signal P1 of "1" shown in FIG. 8-(*g*) is outputted from the AND gate 152. At this time, the initial clear signal IC is in the "1" state, and therefore an AND gate 135*a* opens to feed the signal P1 to a load terminal LO of a sixteen-bit register 123*a*. At this time, also, input terminals of the register 123*a* are supplied with the identification code ID of "0000000000000001" contained in the first to sixteenth stages of the shift register 120*a*, so that this identification ID is loaded into the register 123*a* when the signal P1 is fed to the load terminal LO thereof. Thus, the identification code ID is loaded into the receiver RCa$_1$. When the bit "1" following the start bit of "0" is stored in the 34th stage of the shift register 120*a*, the output signal of the inverter 151 is rendered "0", this causes the signal P1 to fall to "0". At this trailing edge of the signal P1, the counter 155 is cleared, so that the signal at the output terminal [33] thereof becomes "0". As a result, a "1" signal is applied to the enable terminal EN of the counter 155, and therefore the counter 155 begins to up-count the clock pulse $\phi$ from "0" as shown in FIG. 8-(*j*). On the other hand, when the signal outputted from the output terminal [33] of the counter 155 is rendered "0", the AND gate 152 closes, and therefore the AND gate 152 will not output the signal P1 any more even if "0" is inputted to the 34th stage of the shift register 120*a* before the contents of the counter 155 reach "33". The signal P1 of "1" will be outputted again when the next start bit of "0" which is prefixed to the next data outputted from the data generating circuit 101*a* is stored in the 34th stage of the shift register 120*a*.

A signal derived from the sixteenth stage of the shift register 120*a* is supplied to a DFF 158 as a serial data 16D, and this serial data 16D is delayed by one bit-time at the DFF 158 and supplied to a second input terminal of an AND gate 159. As shown in FIG. 8-(*h*), the serial data 16D is delayed by sixteen bit-times with respect to the serial data supplied to the data input terminal SDIa$_1$. On the other hand, a signal outputted from the output terminal [0-14] of the counter 155 is supplied to a first input terminal of the AND gate 159 and to an input terminal of an inverter 161. An output signal of the inverter 161 is supplied to a first input terminal of an AND gate 160, while an output signal of the inverter 162, which inverts the signal P1, is supplied to a second input terminal of the AND gate 160. When the start bit of "0" is outputted from the shift register 120*a* as the data 16D, the AND gate 160 is in an enabled state, so that the start bit of "0" and the data following it are serially supplied to a DFF 164 through the AND gate 160, an OR gate 163 and a selector 132*a*. The data thus supplied to the DFF 164 is delayed by one bit-time at this DFF 164 and is supplied through an output terminal SDOa$_1$ to the second receiver RCa$_2$. Shown in FIG. 8-(*k*) is the serial data outputted from the selector 132*a*. When the LSB of "1" or the foremost bit of the identification code ID is outputted from the shift register 120*a* as the data 16D, the start bit of "0" is stored in the 34th stage of the shift register 120*a* as described above, so that the signal P1 of "1" is outputted from the AND gate 152. As a result, the output signal of the inverter 162 becomes "0", and therefore a "0" signal is outputted from the AND gate 160 and is supplied to the DFF 164 through the OR gate 163 and the selector 132*a*. Thus, as shown in FIG. 8-(*k*), the selector 132*a* outputs a "0" signal instead of the LSB of the identification code ID. Then, when the counter 155 is cleared at the trailing edge of the signal P1, a "1" signal is outputted from the output terminal [0-14] thereof, and therefore the AND gate 159 is enabled to open while the AND gate 160 is closed. As a result, the output of the DFF 158 shown in FIG. 8-(*i*), which is in one-bit-time delayed relation to the data 16D, is supplied through the AND gate 159, the OR gate 163 and the selector 132*a* to the DFF 164 for the duration of fifteen bit-times. It will be appreciated from FIGS. 8-(*i*) and 8-(*k*) that the data thus supplied to the DFF 164 is the first to fifteenth bits of the identification code ID. When the signal at the output terminal [0-14] of the counter 155 is rendered "0", the AND gate 159 is again closed with the AND gate 160 being enabled to open. And thereafter, the data 16D is supplied to the output terminal SDOa$_1$ through the AND gate 160, the OR gate 163, the selector 132*a* and the DFF 164.

As described above, in the receiver RCa$_1$, the identification code ID of "0000000000000001" outputted from the data generating circuit 101*a* is stored in the register 123*a* and is also subjected to a one-bit shift operation to form the new identification code ID of "0000000000000010" which is to be supplied to the second receiver RCa$_2$.

The operation of each of the second to sixteenth receivers RCa$_2$ to RCa$_{16}$ are almost identical to that of the above-described first receiver RCa$_1$, wherein the identification code ID received from the preceding-stage receiver RCa$_{n-1}$ is stored in its internal register 123*a* and is subjected to a one-bit shift operation to form the new identification code ID to be outputted to the succeeding-stage receiver RCa$_{n+1}$.

(b) Normal operation

When the loading of the respective identification codes ID into the respective receivers by the above-described initializing operation has been completed and when the initial clear signal IC is rendered "0", each of the receivers RCa$_1$ to RCa$_{16}$ is enabled to receive data.

In the case where it is desired that the transmitter TMa transmit a given data DA to a specific one or ones of the receivers RCa$_1$ to RCa$_{16}$, the data generating 101*a* of the transmitter TMa outputs the data DA and the kind code KD together with the sixteen-bit identification code ID which includes a bit or bits of "1" at a bit position or bit positions which correspond to the positions of the selected receivers. For example, in the case where the same data DA and kind code KD are to be transmitted to the receivers RCa$_1$, RCa$_3$ and RCa$_5$, the data generating circuit 101*a* outputs an identification ID of "0000000000010101". The following description will be made on the assumption that the above identification ID of "0000000000010101" has been outputted from the data generating circuit 101*a* together with the pule signal TP. In this case, the data DA, the kind code KD and the identification code ID generated by the data generating circuit 101*a* are serially outputted from the output terminal SDOa$_0$ together with the start bit of "0" followed by the bit of "1" in a manner described for the initializing operation. The thus outputted data is shifted into the respective shift registers 120a of the receivers RCa₁ to RCa₁₆. When the start bit of "0" is stored into the 34th stage of each shift register 120a, the signal P1 is outputted from the AND gate 152 and supplied to the first input terminal of the AND gate 137a.

At this time, the identification code ID is outputted from the first to sixteenth stages of each shift register 120a and is supplied to an AND gate 166. This AND gate effects a logical AND operation on each of the pairs of bits of the identification code ID thus supplied from the shift register 120a and the identification code ID stored in the register 123a, and outputs sixteen-bit data representative of the result of the AND operation to an OR gate 167. This OR gate 167 logically adds all of the bits of the sixteen-bit data supplied from the AND gate 166 and outputs the result of this logical addition to a third input terminal of the AND gate 137a.

Thus, when the signal P1 is outputted from each of the AND gates 152 of the receivers RCa₁ to RCa₁₆, only the OR gates 167 of the three receivers RCa₁, RCa₃ and RCa₅ output "1" signals to third input terminals of the AND gates 137a. At this time, the initial clear signal IC is in the "0" state, so that each of the AND gates 137a is supplied with a "1" signal at a second input terminal thereof. And therefore, the signal P1 of each of the receivers RCa₁, RCa₃ and RCa₅ passes through the AND gate 137a and is supplied to a load terminal LO of the register 125a as a signal P2. As a result, the data DA and the kind code KD are loaded into each of the registers 125a of the receivers RCa₁, RCa₃ and RCa₅. The data DA thus loaded into the register 125a is supplied to a data processing circuit 127a of the same receiver while the kind code KD is supplied via a decoder 126a to the data utilization circuit 127a. On the other hand, when the signal P1 is outputted from each AND gate 152, output signals of the OR gates 167 of the receivers RCa₂, RCa₄ and RCa₆ to RCa₁₆ are all "0", and therefore the data DA and the kind code KD contained in the shift registers 120a are not loaded into the registers 125a of the receivers RCa₂, RCa₄ and RCa₆ to RCa₁₆.

Thus, with the structure of the above-described modified data transmission system 100a the transmitter TMa can simultaneously transmit the same data to any ones of the receivers RCa.

In the above-described data transmission system, the bits of the identification code ID are assigned respectively to the receivers RCa₁ to RCa₁₆ from the LSB thereof. However, the bits of the identification code ID may also be assigned respectively to the receivers RCa₁ to RCa₁₆ in the reversed order. In this case, each receiver must create in the initializing operation the new identification code for the succeeding-stage receiver by shifting the bits of the identification code ID by one bit downwardly.

A further modified data transmission system provided in accordance with the present invention will now be described with reference to FIGS. 9 to 13.

Figure 9:
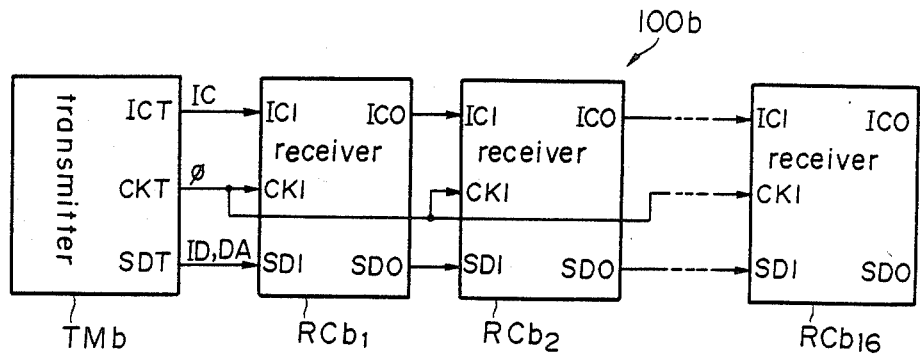
FIG. 9 is a block diagram of a further modified data transmission system 100b provided in accordance with the present invention.

FIG. 9 shows a block diagram of this further modified data transmission system 100b which comprises one transmitter TMb and sixteen receivers RCb₁ to RCb₁₆ of an identical construction. The transmitter TMb is capable of transferring a given data to any one or ones of the receivers RCb₁ to RCb₁₆ and is so constructed as to output an initial clear signal IC from a terminal ICT thereof when power is supplied to this data transmission system 100b. The transmitter TMb outputs a clock signal $\phi$ from a clock output terminal CKT thereof when it is in operation and also outputs, from a data output terminal SDT thereof, a text data DA with an identification code ID indicative of a desired one or ones of the receivers RCb₁ to RCb₁₆ to which the data DA is to be transmitted. Each of the receivers RCb₁ to RCb₁₆ has a clock input terminal CKI, an input terminal ICI for being supplied with an initial clear signal, an output terminal ICO for outputting a delayed initial clear signal, a data input terminal SDI for receiving a serial data, and a data output terminal SDO for outputting a serial data. The clock output terminal CKT of the transmitter TMb is connected to all of the clock input terminals CKI of the receivers RCb₁ to RCb₁₆ so that the clock signal $\phi$ is simultaneously supplied to all of the receivers RCb₁ to RCb₁₆. The terminal ICT of the transmitter TMb is connected to the terminal ICI of the first receiver RCb₁, and the terminal ICO of the receiver RCb$_n$ ("n" is any one of "1" to "16") is connected to the terminal ICI of the succeeding-stage receiver RCb$_{n+1}$. Thus, the initial clear signal IC outputted from the transmitter TMb is supplied to the receivers RCb₁ to RCb₁₆ in a serial manner. Similarly, the terminal SDT of the transmitter TMb is connected to the terminal SDI of the first receiver RCb₁, and the terminal SDO of the receiver RCb$_n$ is connected to the terminal SDI of the succeeding-stage receiver RCb$_{n+1}$. Thus, the data DA outputted from the transmitter TMb is supplied to the receivers RCb₁ to RCb₁₆ in a serial manner.

Figure 11:
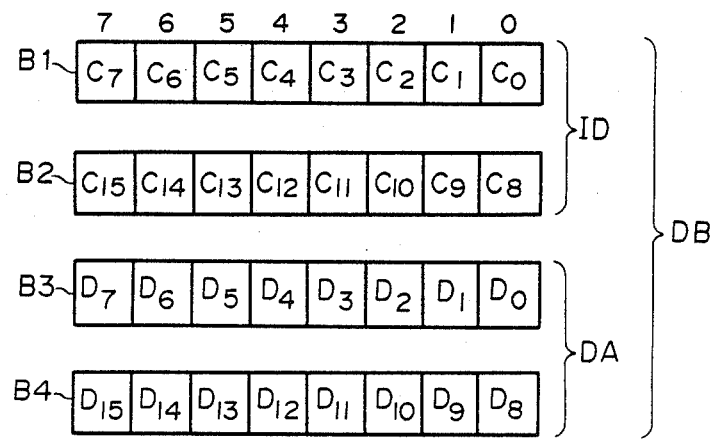
FIG. 11 is an illustration showing the format of the data block DB outputted from the transmitter TMb of the data transmission system of FIG. 9.
Figure 10:
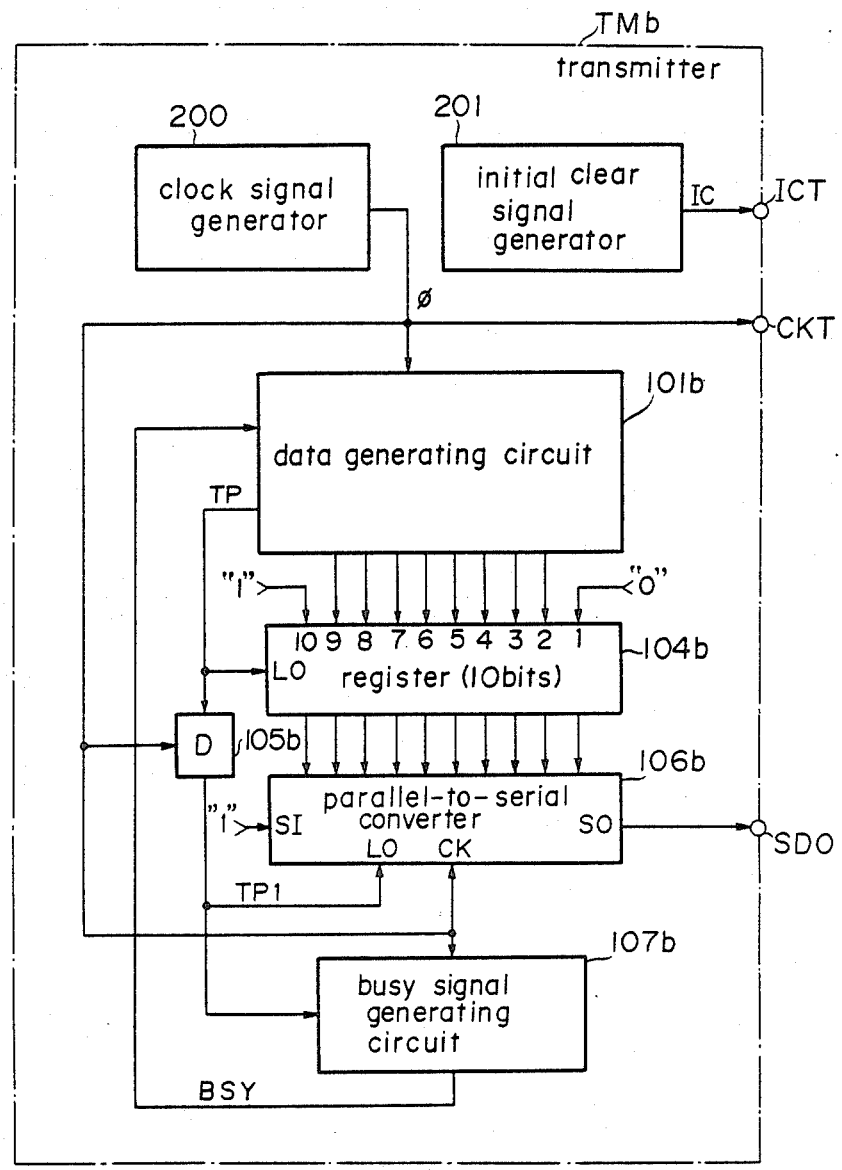
FIG. 10 is a circuit diagram of the transmitter TMb of the data transmission system 100b of FIG. 9.

As shown in FIG. 10, the transmitter TMb comprises a clock signal generator 200 which outputs the clock signal $\phi$, and an initial clear signal genertor 201 which outputs the initial clear signal IC when the power is supplied thereto or to this dat transmission system 100b. The transmitter TMb also includes a data generating circuit 101b for generating information to be transmitted to the receivers RCb₁ to RCb₁₆. This data generating circuit 101b is constructed so as to output, per each transmission of data, four bytes of data or a block of data DB to a ten-bit register 104b on a byte basis. As shown in FIG. 11, the first and second bytes B1 and B2 of the data block DB contain an identification code ID of a selected one of the receivers RCb₁ to RCb₁₆ to which a text data DA is to be transmitted, while the third and fourth bytes B3 and B4 of the data block DB contain the text data DA. The sixteen-bit identification code ID contained in the first and second bytes B1 and B2 is of such a bit pattern that includes only one bit of "1", so that sixteen kinds of identification codes ID is available. These sixteen kinds of identification codes ID are assigned to the receivers RCb₁ to RCb₁₆ as follows:

| receiver | identification code ID |
|---|---|
| RCb₁ | "1000000000000000" |
| RCb₂ | "0100000000000000" |
| RCb₃ | "0010000000000000" |
| ⋮ | ⋮ |
| RCb₁₅ | "0000000000000010" |
| RCb₁₆ | "0000000000000001" |

When outputting each byte of the data block DB, the data generating circuit 101 simultaneously outputs a pulse signals TP. The register 104b is composed of a ten-stage register, and each byte of the data block DB outputted from the data generating circuit 101b is applied to the second to ninth stages thereof. The first stage of the register 104b is always supplied with a signal of "1" while the last stage of the register 104b is always supplied with a signal of "0". Each time the pulse TP is applied to a load terminal LO of the register 104b, the data of one byte outputted from the data generating circuit 101b is loaded together with the signals "0" and "1" into the register 104b. The pulse signal TP is also supplied to a DFF 105b which causes the supplied pulse signal TP to be delayed by a time period equal to the period of the clock signal $\phi$ or one bit-time and outputs the delayed pulse signal TP as a pulse signal TP1. The ten-bit output data of the register 104b is loaded into a parallel-to-serial converter 106b composed of a ten-stage presettable shift register when the pulse signal TP1 is supplied to a load terminal LO thereof. When the signal TP1 at the load terminal LO is in the state of "0", the parallel-to-serial converter 106b shifts its contents out from an output terminal SO thereof in accordance with the clock signal $\phi$ supplied to a clock terminal CK of the parallel-to-serial converter 106b, and the data thus shifted out from the output terminal SO is supplied to an output terminal $SDO_0$ of the transmitter TMb. An input terminal SI of the parallel-to-serial converter 106b is always supplied with a signal of "1" so that "1" is shifted into the parallel-to-serial converter 106b when the signal TP1 is in the state of "0". The pulse signal TP1 is also supplied to a busy signal generating circuit 107 which is so constructed as to output at the leading edge of the signal TP1 a busy signal BSY having a time duration equal to ten bit-times. This busy signal BSY is supplied to the aforesaid data generating circuit 101b and inhibits the data generating circuit 101b from outputting the next byte of data block DB.

Figure 12:
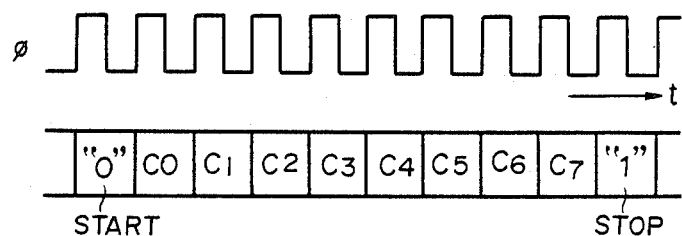
FIG. 12 is an illustration showing the lower byte B1 of the identification code ID and the start and stop bits thereof serially outputted from the transmitter TMb in accordance with the clock pulse $\phi$.

With the structure of this transmitter TMb, when the data generating circuit 101b outputs the data block DB, the first to fourth bytes B1 to B4 of the data block DB are successively loaded into the parallel-to-serial converter 106b. In this case, a start bit of "0" and a stop bit of "1" are appended to each byte of the data block DB as the foremost bit and the rearmost bit, respectively. And each byte thus loaded into the converter 106b with the start and stop bits is outputted therefrom bit by bit in accordance with the clock signal $\phi$. Thus, when the transmitter TMb outputs the data block DB, in the first place, the start bit of "0", the first bit C0 or the LSB to the eighth bit C7 of the identification code ID, and the stop bit of "1" are serially outputted from the data output terminal SD0, as shown in FIG. 12. Then, the start bit of "0", the ninth bit C8 to the sixteenth bit C15 or the MSB of the identification code ID, and the stop bit of "1" are serially outputted from the data output terminal SD0. In a similar manner, the bits D0 to D7 of the lower byte B3 of the text data DA and the bits D8 to D15 of the upper byte B4 of the data DA are serially outputted from the data output terminal SD0 together with the start and stop bits thereof. When the transmitter TMb does not effect a transmission of data, "1" signals are successively outputted from the data output terminal SD0.

The construction of the first receiver $RCb_1$ will now be described with reference to FIG. 13. Shown at 202 is a DFF which delays the initial clear signal IC supplied thereto through the input terminal ICI by one bit-time of the clock signal $\phi$, and supplies the delayed initial clear signal ICd to various portions of the circuitry of this receiver $RCb_1$. The delayed initial clear signal ICd is further delayed one bit-time by a DFF 203 and is supplied through the output terminal ICO to the second receiver $RCb_2$. The clock signal $\phi$ fed to the clock input terminal CKI is supplied to the DFFs 202 and 203 and other portions of the circuitry of this receiver $RCb_1$. The serial data supplied from the transmitter TMb to the data input terminal SDI is subjected to a processing, which will be described later, in this receiver $RCb_1$, and the processed data is outputted from the data output terminal SDO to the second receiver $RCb_2$. The serial data fed to the data input terminal SDI is inputted to the first stage of a shift register 204 which is composed of serially connected nine DFF. The data thus inputted to the first stage of the shift register 204 is shifted in accordance with the clock signal $\phi$ toward the ninth stage thereof. The contents of the first stage of the shift register 204 are outputted therefrom as data SF0, and the contents of the second to ninth stages of the shift register 204 are outputted to input terminals of eight-bit registers 205a and 205b in a parallel fashion. The register 205a is loaded with the data at their input terminals when a signal DY2 is applied to a load terminal LD thereof, and the register 205b is loaded with the data at their input terminals when a signal DY3 is applied to a load terminal LD thereof. The data thus loaded into the registers 205a and 205b are supplied to a data utilization circuit 207. A DFF shown at 206 delays the signal DY3 of "1" by one bit-time and supplies the delayed signal of "1" to the data utilization circuit 207. The data processing circuit 207 stores the data supplied from the registers 205a and 205b into an internal memory thereof when the "1" signal is outputted from the DFF 206, and effects a processing of data in accordance with the data stored in the internal memory.

Shown at 208 is a one-bit register which stores the data SF0 in response to the clock signal $\phi$ and outputs the stored data to an input terminal B of a selector 209. Thus, the data SF0 is delayed by one bit-time at the register 208 and is supplied to the selector 209. The register 208 is enabled to load the data SF0 thereinto only when a signal of "1" is applied to a load terminal LD of the register 208. The register 208 is cleared when a signal of "1" is applied to a clear terminal CL thereof. The selector 209 outputs data at an input terminal A thereof when a signal "1" is supplied to a selection control terminal SA of the selector 208. On the other hand, when a signal of "0" is supplied to the selection control terminal SA, the selector 209 outputs data at the input terminal B thereof.

A four-bit counter 210 is provided for counting the number of bit of the data inputted to the shift register 204 and is hereinafter referred to as "bit counter". This bit counter 210 is constructed so as to upwardly count the clock signal $\phi$ supplied to a clock input terminal CK thereof. The bit counter 210 has preset terminals P0 to P3, to which a bit pattern of "1001" ("9" in decimal) is always supplied, so that this bit counter 210 is loaded with a data "9" when the initial clear signal IC is supplied to a load terminal LD thereof at the start-up of this data transmission system. The bit counter 210 is enabled to count the clock signal $\phi$ only when a "1" signal is supplied to an enabling terminal EN thereof. Shown at 211 is a two-bit counter (hereinafter referred to as "byte counter") for detecting which one of the four bytes of the data block DB is inputted to the shift register 204. The byte counter 211 is enabled to count the clock signal $\phi$ only when a "1" signal is supplied to an enabling terminal EN thereof, and is loaded with a bit pattern of "11" ("3" in decimal), applied to preset input terminals P0 and P1 thereof, when the initial clear signal IC is supplied to a load terminal LD of the byte counter 211.

The operation of this receiver $RCb_1$ will now be described with reference to a timing chart shown in FIG. 14.

Figure 13:
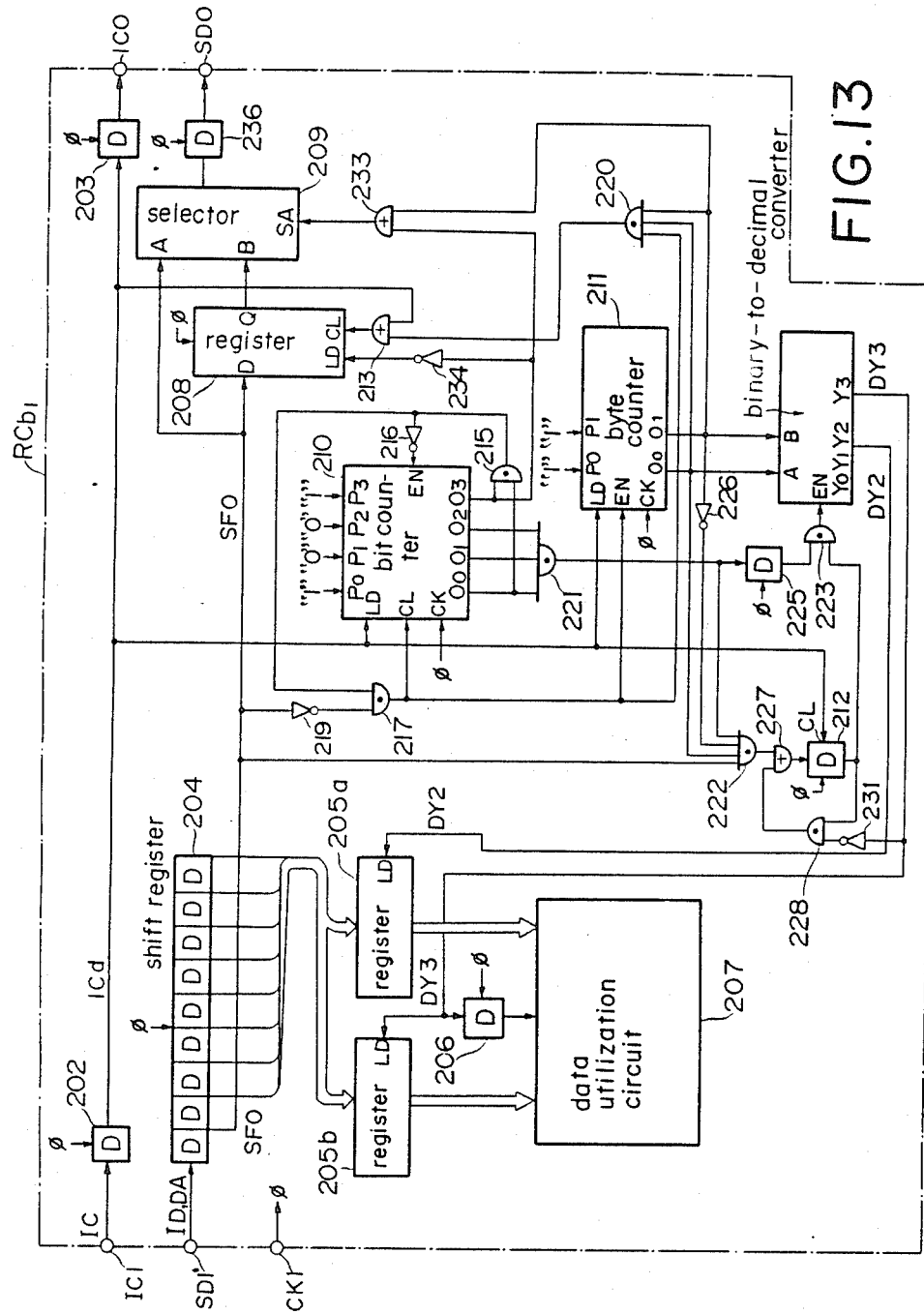
FIG. 13 is a circuit diagram of the receiver $RCb_1$ of the data transmission system 100b of FIG. 9.

When a power is supplied to this data transmission system 100b, the transmitter shown in FIG. 10 outputs the initial clear signal IC to the input terminal ICI of the receiver $RCb_1$ shown in FIG. 13, so that the signal ICd is generated. As a result, data "9" and "3" are loaded into the bit counter 210 and the byte counter 211, respectively, and a DFF 212 is cleared. The signal ICd is also supplied through an OR gate 213 to the clear terminal CL of the register 208, and therefore the register 208 is cleared. Upon being loaded with the data "9", the bit counter 210 outputs "1" signals respectively from output terminals $O_0$ and $O_3$ thereof, so that a "1" signal is outputted from an AND gate 215. This causes an inverter 216 to output a "0" signal, and therefore the bit counter 210 is disabled from counting the clock signal $\phi$, so that the data "9" loaded into the bit counter 210 is held unchanged. The "1" signal outputted from the AND gate 215 also enables an AND gate 217 to open.

Figure 14:
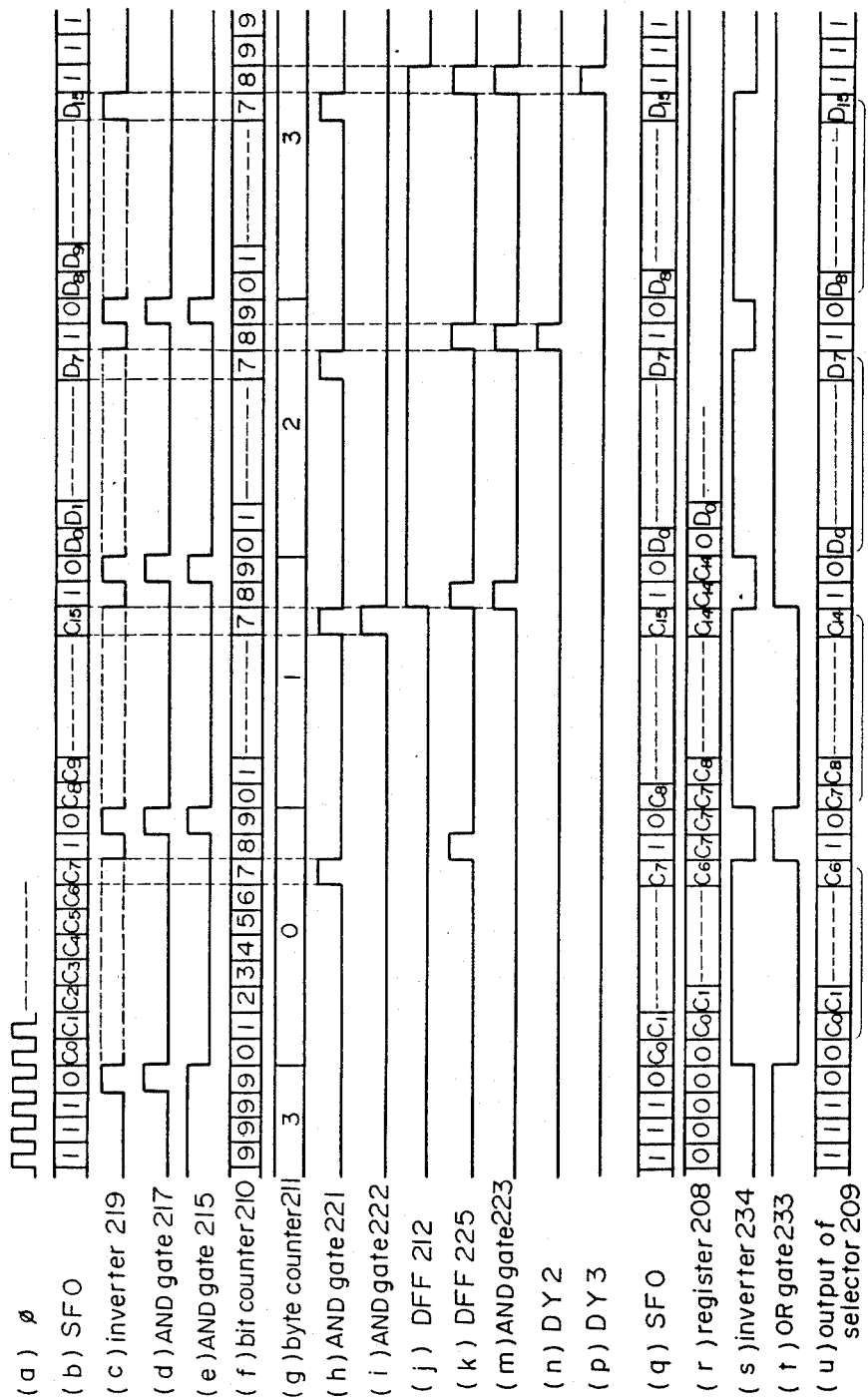
FIG. 14 is a timing chart of the various signals appearing in the transmitter TMb and receiver $RC_1$ of FIGS. 10 and 13.

Then, when the transmitter TMb outputs the serial data containing the identification code ID and the text data DA from the output terminal SDT in synchronization with the clock signal $\phi$ shown in FIG. 14-(a), the serial data is supplied to the input terminal of the shift register 204 through the data input terminal SDI of the receiver $RCb_1$ and is shifted into the shift register 204. In this case, the serial data thus supplied to the shift register 204 is outputted from the first stage thereof as the data SF0 (see FIG. 14-(b)). When the start bit "0" appended to the lower byte B1 (bits C0 to C7) of the identification code ID is outputted as the data SF0, an output of an inverter 219 is rendered "1" as shown in FIG. 14(c), so that the output of the AND gate 217 shown in FIG. 14-(d) becomes "1". The "1" signal outputted from the AND gate 217 is applied to the clear terminal CL of the bit counter 210, the enabling terminal EN of the byte counter 211 and a first input terminal of a three-input AND gate 220. The "1" signal applied to the clear terminal CL of the bit counter 210 causes this counter to be cleared at the leading edge of the next clock signal $\phi$. When the bit counter 210 is cleared, the output signal of the AND gate 215 shown in FIG. 14-(e) is rendered "0", so that the output of the AND gate 217 becomes "0". Thus, the output of the AND gate 217 is kept in the "1" state for a period equal to one bit-time of the clock pule $\phi$, as shown in FIG. 14-(d).- When the output of the AND gate 215 becomes "0", a "1" signal is supplied to the enabling terminal EN of the bit counter 210, so that the bit counter is caused to begin the count operation of the clock signal $\phi$. The variation of the contents of the bit counter 210 is shown in FIG. 14-(f). When the "1" signal outputted from the AND gate 217 is applied to the enabling terminal EN of the byte counter 211, the byte counter 211 is enabled to count the clock pulse $\phi$, and the contents of the counter 211 are incremented by one at the leading of the next clock pulse $\phi$. As a result, the contents of the byte counter 211 are rendered "0", as shown in FIG. 14-(g). Also, when the "1" signal outputted from the AND gate 217 is supplied to the AND gate 220, the AND gate 220 outputs a "1" signal since the contents of the byte counter 211 is "3" at this time. The "1" signal outputted from the AND gate 220 is supplied to the clear terminal CL of the register 208 through the OR gate 213.

Then, the bits C0 to C7 of the lower byte B1 of the identification code ID are sequentially inputted to the shift register 204. When the bit C7 is inputted to the first stage of the shift register 204, the contents of the bit counter 210 become "0111" ("7" in decimal), so that an AND gate 221 outputs a "1" signal. At this time, however, AND gates 222 and 223 are closed, and therefore the "1" signal outputted from the AND gate 221 does not affect the operation of the circuit of the receiver $RCb_1$. Then, the stop bit of the first byte B1 and the start bit of the second byte B2 are successively inputted to the first stage of the shift register 204, whereupon the output of the AND gate 217 again becomes "1". As a result, in a manner described for the start bit of the first byte B1, the bit counter 210 is cleared, and at the same time the contents of the byte counter 211 are increased to "1", as shown in FIG. 14-(g). At this time, the AND gate 220 is closed, however, so that the AND gate 220 does not output a "1" signal.

Then, the bits C8 to C15 of the upper byte B2 of the identification code ID are sequentially inputted to the shift register 204. And, when the bit C15 or the MSB of the identification code ID is inputted to the first stage of the shift register 204, the contents of the bit counter 210 becomes "7", so that a "1" signal is outputted from the AND gate 221, as shown in FIG. 14-(h). The "1" signal outputted from the AND gate 221 is supplied to the fourth input terminal of the AND gate 222 and the input terminal of a DFF 225. When the "1" signal is supplied to the fourth input terminal of the AND gate 222, the first input terminal of the AND gate 222 is supplied with the bit C15 (MSB) of the identification code ID while the second and third input terminals of the AND gate 222 are supplied respectively with the "1" signal outputted from the output terminal $O_O$ of the byte counter 211 and a "1" signal outputted from an inverter 226 which inverts the "0" signal at the output terminal $O_1$ of the byte counter 211. And therefore, the AND gate 222 outputs a "1" signal if the bit C15 is "1", while the AND gate 222 outputs a "0" signal if the bit C15 is "0". Thus, this AND gate 222 detects whether the bit C15 of the identification code ID is "1" or "0". The following description is made on the assumption that the bit C15 of the identification code ID is "1". When the AND gate 222 outputs a "1" signal through an OR gate 227 to the DFF 212, as shown in FIG. 14-(i), an output signal of this DFF 212 is rendered "1", as shown in FIG. 14-(j). This "1" signal is supplied to an input terminal of the AND gate 223, and is also supplied through an AND gate 228 and the OR gate 227 to the input terminal of the DFF 212 to hold the output signal thereof in the "1" state. The "1" signal thus outputted from the DFF 212 is used for enabling the text data DA to be inputted to the registers 205a and 205b, as more fully described later. On the other hand, when the "1" signal outputted from the AND gate 221 is supplied to the DFF 225, the DFF 225 delays the "1" signal by one bit-time and supplies the delayed "1" signal to the first input terminal of the AND gate 223, as shown in FIG. 14-(k). At this time, the second input terminal of the AND gate 223 is supplied with the "1" signal outputted from the DFF 212 as described above, so that the "1" signal outputted from the DFF 225 is supplied through the AND gate 223 to an enabling terminal EN of a binary-to-decimal converter 230. When being supplied with the "1" signal at the enabling terminal EN, the binary-to-decimal converter 230 converts the binary output of the byte counter 211 fed to input terminals A and B thereof into a decimal data, and outputs the decimal data from output terminals Y0 to Y3 thereof. At this time, the binary output of the byte counter 211 is "01", so that a "1" signal is outputted from the output terminal Y1 of the binary-to-decimal converter 230 when the "1" signal outputted from the AND gate 223 is supplied to the enabling terminal EN thereof. The output terminal Y1 has no connection however, so that the "1" signal outputted from this output terminal Y1 does not affect the operation of this receiver $RCb_1$.

Thus, when the bit C15 of the identification code ID is inputted to the first stage of the shift register 204, the determination whether the bit C15 is "1" or "0" is made by the AND gate 222, and the DFF 212 is set to "1" if the bit C15 is determined to be "1".

Then, the stop bit of the second byte B2 and the start bit of the third byte B3 are successively inputted to the first stage of the shift register 204, as shown in FIG. 14-(b), whereupon a "1" signal is again outputted from the gate 217. As a result, the bit counter 210 is cleared, and the contents of the byte counter 211 are increased to "2", as shown in FIG. 14-(g). Then, the bits D0 to D6 of the text data DA are sequentially inputted to the shift register 204. Then, when the bit D7 of the data DA is inputted to the first stage of the shift register 204, the contents of the bit counter 210 become equal to "7", so that a "1" signal is outputted from the AND gate 221. The DFF 225 delays the "1" signal outputted from the AND gate 221 by one bit-time, and supplies the delayed "1" signal to the first input terminal of the AND gate 223. Thus, the DFF 225 outputs the "1" signal when the contents of the bit counter 210 are equal to "8", that is to say, when the second to ninth stages of the shift register 204 store the bits D0 to D7 of the data DA. The "1" signal outputted from the DFF 225 is supplied through the AND gate 223 to the enabling terminal EN of the binary-to-decimal converter 230 since the DFF 212 is in the set state at this time. When the "1" signal is supplied to the enabling terminal EN of the binary-to-decimal converter 230, the byte counter 211 outputs binary data "10" ("2" in decimal) to the input terminals A and B, so that the binary-to-decimal converter 230 outputs a "1" signal from the output terminal Y2 thereof. This "1" signal is supplied as signal DY2 to the load terminal LD of the register 205a, as shown in FIG. 14-(n), whereupon the bits D0 to D7 of the data DA contained in the second to ninth stages of the shift register 204 are loaded into the register 205a.

When the start bit of "0" appended to the upper byte B4 of the data DA is inputted to the first stage of the shift register 204, the bit counter 210 is cleared in a manner described for the above case, and also the contents of the byte counter 211 are increased to "3". Thereafter, the bits D8 to D14 of the data DA are sequentially inputted to the shift register 204. Then, the bit D15 of the data DA is inputted to the first stage of the shift register 204, whereupon the contents of the bit counter 210 become "7", so that the AND gate 221 again outputs a "1" signal. And, when the bits D8 to D15 of the data DA are stored respectively into the second to ninth stages of the shift register 204, A "1" signal is outputted from the DFF 225 and supplied through the AND gate 223 to the enabling terminal EN of the binary-to-decimal converter 230. At this time, the binary counter 211 outputs binary data of "11" ("3" in decimal) to the output terminals A And B of the binary-to-decimal converter 230. And therefore, when the "1" signal is supplied to the enabling terminal EN of the binary-to-decimal converter 230, this converter 230 outputs a "1" signal from the output terminal Y3. This "1" is supplied to the load terminal LD of the register 205b as signal DY3, as shown in FIG. 14-(p), whereupon the bits D8 to D15 of the data DA in the second to ninth stages of the shift register 204 are loaded into the register 205b. The signal DY3 is also supplied to the DFF 206 and is outputted therefrom one bit-time later to the data processing circuit 207. The data utilization circuit 207 detects the fact that the upper and lower bytes of the data DA have been loaded respectively into the registers 205a and 205b in accordance with the output of the DFF 206, and then stores the data DA contained in the registers 205a and 205b into an internal memory thereof. On the other hand, the signal DY3 of "1" is inverted by the inverter 231 and supplied to the AND gate 228. As a result, a "0" signal is outputted from the AND gate 228 and supplied through the OR gate 227 to the input terminal of the DFF 212, whereby the DFF 212 is reset (FIG. 14-(j)).

The foregoing is the operation of the receiver $RCb_1$ to store the data DA into the data utilization circuit 207. It will be appreciated from the above description that the data DA is stored into the data utilization circuit 207 only when the MSB of the identification code ID is "1". If the MSB of the identification code ID is "0", the DFF 212 is not set, so that the data DA is not stored into the data utilization circuit 207.

In addition to the above-described operation, the receiver $RCb_1$ creates a new identification code ID by subjecting the identification code ID, fed to the input terminal SDI thereof, to a one-bit shift operation, and outputs the new identification code ID together with the data DA through the data output terminal SDO thereof to the second receiver $RCb_2$. This operation of the receiver $RCb_1$ will now be described with reference to FIG. 14 in which the data SFO shown at (b) is again illustrated at (q) for better understanding.

As described before, the serial data fed to the data input terminal SDI is delayed by one bit-time and serially outputted from the first stage of the shift register 204 as the data SFO. When the start bit of "0" appended to the lower byte B1 of the identification code ID is outputted as the data SFO, a "1" signal is outputted from the AND gate 217 and supplied to the first input terminal of the AND gate 220. As a result, a "1" signal is outputted from the AND gate 220, so that the register 208 is cleared. On the other hand, the contents of the bit counter 210 are "9" at this time, and this causes a "1" signal to be outputted from the output terminal $O_3$ thereof. As a result, an OR gate 233 outputs a "1" signal (see FIG. 14-(t)), so that the selector 209 selects the input terminal A thereof. Thus, when the start bit of "0" is outputted from the first stage of the shift register 204 as the data SF0, the start bit of "0" is outputted from the selector 209, as shown in FIG. 14-(u). At this time, an inverter 234 outputs a "0" signal (see FIG. 14-(s)), so that the register 208 is disabled from loading data.

Then, when the bit C0 of the identification code ID is outputted from the first stage of the shift register 204 as the data SF0, the bit counter 210 is cleared, so that a "0" signal is outputted from the output terminal 03 thereof. At this time, the byte counter 211 also outputs a "0" signal from the output terminal $O_1$ thereof to the second input terminal of the OR gate 233, and therefore the selector 209 selects the input terminal B thereof. At this time, also, the register 208 outputs data "0" since the register 208 has been cleared by the output of the AND gate 220. And therefore, when the bit C0 of the identification code ID is outputted as the data SF0, the selector 209 outputs the data "0" (FIG. 14-(u)). On the other hand, when the bit C0 is outputted as the data SF0, the output of the inverter 234 shown in FIG. 14-(s) is rendered "1" to enable loading of data of the register 208. As a result, the register 208 thereafter sequentially loads the data SF0 in accordance with the clock pulse $\phi$ and supplies the loaded data to the input terminal B of the selector 209 as shown in FIG. 14-(r).

During the time when the bits C1 to C7 of the identification code ID are sequentially outputted as the data SF0, the bit counter 210 outputs a "0" signal from the output terminal $O_3$ thereof, so that the OR gate 233 outputs a "0" signal to cause the selector 209 to select its input terminal B. As a result, the bits C0 to C6 of the identification code ID outputted from the register 208 are sequentially outputted from the selector 209. Then, when the stop bit of the lower byte B1 of the identification code ID is outputted as the data SF0, the contents of the bit counter 210 are "1000" ("8" in decimal), so that the counter 210 outputs a "1" signal from the output terminal $O_3$. Consequently, the OR gate 233 outputs a "1" signal to cause the selector 209 to select the input terminal A thereof. Thus, when the stop bit of the lower byte B1 of the identification code ID is outputted as the data SF0, this stop bit is outputted from the selector 209. On the other hand, when the "1" signal is outputted from the output terminal $O_3$ of the bit counter 210, the inverter 234 outputs a "0" signal to inhibit the register 208 from loading the data SF0. At this time, the register 208 contains therein the bit C7 of the identification code ID, and therefore this bit C7 is held contained in the register 208 thereafter.

Then, when the start bit of the upper byte B2 of the identification code ID is outputted as the SF0, this start bit is outputted from the selector 209 since the OR gate 233 outputs a "1" signal at this time. And when the bit C8 of the identification code ID is outputted as the data SF0, the bit counter 210 is cleared, and therefore the output of the OR gate 233 is rendered "0". As a result, when the bit C8 is outputted as the data SF0, the bit C7 in the register 208 is outputted from the selector 209. At this time, the output of the inverter 234 is rendered "1", so that, thereafter, the bits C8, C9, ... of the identification code ID are sequentially loaded into the register 208.

During the time when the bits C9 to C15 of the identification code ID are sequentially outputted as the data SF0, the OR gate 233 outputs a "0" signal, so that the selector 209 sequentially outputs the bits C8 to C14 fed from the register 208. Then, when the stop bit of "1" of the second byte B2 and the start bit of "0" of the third byte B3 are outputted as the data SF0, the OR gate 233 outputs a "1" signal, and therefore the selector 209 sequentially outputs these bits of "1" and "0" . When the bit D0 of the data DA is outputted as the data SF0, the contents of the byte counter 211 are "10" ("2" in decimal), so that the counter 211 outputs a "1" signal from the output terminal $O_1$ thereof. The byte counter 211 continues to output the "1" signal from the output terminal $O_1$ thereof even when the contents of the counter 211 are changed to "11" ("3" in decimal). And therefore, the OR gate 233 continues to output a "1" signal after the the bit D0 is outputted as the data SF0 (until the byte counter 211 is reset). Thus, from the time when the bit D0 is outputted as the data SF0, the data SF0 is sequentially outputted from the selector 209.

Thus, when the data SF0 shown in FIG. 14-(q) is sequentially outputted from the first stage of the shift register 204, the selector 209 sequentially outputs the data shown in FIG. 14-(u). More specifically, the bits C0 to C15 of the identification code ID are shifted one bit in the direction of the MSB thereof, and the lower eight bits of the result of the shift or "0, C0, ... C6" and the higher eight bits of the result of the shift or "C7, C8, ... C14" are used to respectively form the lower and higher bytes of the new identification code ID for the second receiver $RCb_2$. In this case, a start bit of "0" and a stop bit of "1" are appended to each of the lower and higher bytes of the new identification code ID. The thus formed new identification code ID is outputted bit by bit from the selector 209 together with the data DA outputted from the first stage of the shift register 204. The output of the selector 209 is delayed by one bit at a DFF 236 and supplied via the data output terminal SDO to the second receiver $RCb_2$.

The foregoing is the structure and operation of the receiver $RCb_1$. The second to sixteenth receivers $RCb_2$ to $RCb_{16}$ are identical in construction to the above-described first receiver $RCb_1$, and therefore operate in the same manner. More specifically, the receiver $RCb_n$ ("n" is any one of "2" to "16") shifts the identification code ID received from the preceding-stage receiver $RCb_{n-1}$ by one bit to form a new identification code ID and outputs the new identification code ID together with the data DA received from the preceding-stage receiver $RCb_{n-1}$ to the succeeding-stage receiver $RCb_{n+1}$. And each of the first to sixteenth receivers $RCb_1$ to $RCb_{16}$ stores the received data DA into the data utilization circuit 207 thereof only when the MSB of the identification code ID received with the data DA is "1".

With this further modified data transmission system, if the transmitter TMb outputs data DA with an identification code ID of "1000000000000000", the data DA is stored in the data utilization circuit 207 of the first receiver $RCb_1$. On the other hand, in the case where the transmitter TMb outputs data DA with an identification code ID of "0000000000000001", the data DA is stored into data utilization circuit 207 of the sixteenth receiver $RCb_{16}$. Also, in the case where the transmitter TMb outputs data DA with an identification code ID of "1010100000000000", the data DA is stored into the data utilization circuits 207 of the first, third and fifth receivers $RCb_1$, $RCb_3$ and $RCb_5$. And in the case where the transmitter TMb outputs data DA with an identification code ID of "1111111111111111", the data DA is stored into all of the data utilization circuits 207 of the first to sixteenth receivers $RCb_1$ to $RCb_{16}$.

With the structure of the above-described further modified data transmission system, the lower byte of the identification code ID, the higher byte of the identification code ID, the lower byte of the data DA and the higher byte of the data DA are sequentially outputted in a continuous manner from the transmitter TMb. However, those bytes of the data block DB may be outputted from the transmitter TMb with a certain length of time interposed between adjacent ones of the bytes, since the transmitter TMb is so constructed as to continuously output a "1" signal when there is no data DA nor identification code ID to be outputted to avoid any possible incorrect operation of the receivers $RCb_1$ to $RCb_{16}$.

Furthermore, with the above further modified data transmission system, each of the receivers $RCb_1$ to $RCb_{16}$ determines whether the received data DA is to be stored in the register 207 thereof in accordance with the state of the bit C15 or MSB of the identification code ID. However, such a determination may be made in accordance with any one of the bits of the identification code ID. Also, the shift of the identification code ID in each receiver may be made in the direction of the LSB, and the amount of the shift should not be restricted to one.

What is claimed is:

1. A data transmission system comprising:
    (a) initialization signal generating means responsive to an application of power to said transmission system for producing an initialization signal;
    (b) transmitter means connected to said initialization signal generating means and including initialization data generating means responsive to said initialization signal for generating initialization data of a predetermined value and a data output terminal for transmitting said initialization data via said output terminal; and
    (c) first to Nth (N: integer greater than or equal to 2) receiver means which are connected in a cascade format in the ordinal number order and connected to said initialization signal generating means wherein said nth ($1 \leq n \leq N$) receiver means comprises a nth input terminal, nth register means, nth modifying means and a nth output terminal;
    in said first receiver means, in response to said initialization signal, said first modifying means receiving said initialization data via said first input terminal, modifying said initialization data and delivering the modified initialization data as first output data via said first output terminal, and said first register means storing first identification data corresponding to said initialization data and identifying said first receiver means, and
    in said kth ($2 \leq k \leq N$) receiver means, in response to said initialization signal, said kth modifying means receiving a (k−1)th output data via said kth input terminal, modifying said (k−1)th output data and delivering the modified (k−1)th output data as kth output data via said kth output terminal and said kth register means storing kth identification data corresponding to said (k−1)th output data and identifying said kth receiver means.

2. A data transmission system according to claim 1, wherein said first to Nth receiver means comprise like input terminals, register means, modifying means, and output terminals.

3. A data transmission system according to claim 1, wherein said nth receiver means further comprises nth selector means for feeding said nth output data to said nth output terminal when said initialization signal is supplied to said nth receiver means and for feeding data supplied to said nth input terminal to said nth output terminal when said initialization signal is not supplied to said nth receiver means.

4. A data transmission system according to claim 1, wherein said initialization signal generating means produces said initialization signal for a predetermined time and wherein said transmitter means further comprises data output means for outputting a given data together with register indication data equal to a desired one among said first to Nth identification data to said data output terminal of said transmitter means after said initilization signal ceased.

5. A data transmission system according to claim 4, wherein said nth receiver means further comprises nth comparator means for comparing said nth identification data with said register indication data and for outputting nth coincidence signal when said nth identification data and said register indication data coincide with each other, and nth data utilization circuit means responsive to said nth coincidence signal for utilizing said given data.

6. A data transmission system according to claim 4, wherein said nth receiver means further comprises nth special data detecting means for detecting a special data in said register indication data and for outputting a special data detection signal and wherein said data utilization circuit means utilizing said given data when said special data detection signal is outputted.

7. A data transmission system according to claim 4, wherein said nth receiver means further comprises nth gate means for effecting a logical operation on said nth identification data and said register indication data, and nth data utilization circuit means for utilizing said given data in accordance with the result of said logical operation.

8. A data transmission system according to claim 1, wherein said nth modifying means comprises nth adder means for adding a predetermined value to said (n−1)th output data and for supplying the result of said addition to said nth output terminal as said nth output data.

9. A data transmission system according to claim 1, wherein said nth modifying means comprises nth shifting means for shifting said (n−1)th output data by a predetermined number of bits and for supplying the result of said shifting to said nth output terminal as said nth output data.

10. A data transmission system comprising:
    (a) transmitter means having a data output terminal and data output means for outputting receiver indication data and given data; and
    (b) first to Nth (N: integer greater than or equal to 2) receiver means which are connected in a cascade format in the ordinal number order wherein said nth ($1 \leq n \leq N$) receiver means comprises an nth input terminal, nth modifying means, nth detecting means, an nth output terminal and nth data utilization circuit means;
    in said first receiver means, said first modifying means receiving said receiver indication data and said given data via said nth input terminal, modifying said receiver indication data and delivering the modified receiver indication data as first output data together with said given data via said first output terminal, said first detecting means for outputting a first detection signal when said first output data satisfies a predetermined condition common to said first to Nth receiver means and said first data utilization circuit means utilizing said given data when said first detection signal is outputted, and
    in said kth ($2 \leq k \leq N$) receiver means, said kth modifying means receiving a (k−1)th output data via said kth input terminal, modifying said (k−1)th output data and delivering the modified (k−1)th output data as kth output data together with said given data via said kth output terminal, said kth detecting means for outputting a kth detection signal when said kth output data satisfies said predetermined condition and said kth data utilization circuit means utilizing said given data when said kth detection signal is outputted.

11. A data transmission system according to claim 10, wherein said transmitter means outputs said receiver indication data and said given data bit by bit, and wherein said nth modifying means comprises delay circuit means for delaying said (n−1)th output data by a time period corresponding to a predetermined number of bits to output the delayed (n−1)th output data as said nth output data, and data feeding means for feeding, bit by bit, said nth output data together with said given data.

12. A data transmission system according to claim 10, wherein said nth modifying means comprises nth shift means for shifting said (n−1)th output data by a predetermined number of bits in a predetermined direction and for outputting the shifted (n−1)th output data as said nth output data.

13. A data transmission system according to claim 10, wherein said predetermined condition is that a value of a specific bit position of said nth output data has a predetermined logical value.

14. A data transmission system according to claim 10, wherein said first to Nth receiver means comprise like input terminals, modifying means, detecting means, output terminals, and utilization circuit means.

* * * * *